(12) United States Patent
Sheopuri et al.

(10) Patent No.: US 11,386,358 B2
(45) Date of Patent: Jul. 12, 2022

(54) INTELLIGENT DECISION SUPPORT SYSTEM

(71) Applicant: INTERNATIONAL BUSINESS MACHINES CORPORATION, Armonk, NY (US)

(72) Inventors: Anshul Sheopuri, Bergen, NJ (US); Binny Rieder, Armonk, NY (US); Pooja Arya, New Delhi (IN); Nickle Lamoreaux, Armonk, NY (US); Joanna Daly, New York, NY (US); Saikat Mukhopadhyay, Kolkata (IN); Priyanka Dasgupta, Bangalore (IN); Nandakishore Kambhatla, Bangalore (IN); Aditya Telang, Bangalore (IN); Priyanka Agrawal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 756 days.

(21) Appl. No.: 16/386,402

(22) Filed: Apr. 17, 2019

(65) Prior Publication Data

US 2020/0334580 A1 Oct. 22, 2020

(51) Int. Cl.
*G06N 20/20* (2019.01)
*G06N 5/02* (2006.01)
*G06F 16/9035* (2019.01)
*G06F 16/9032* (2019.01)
*G06F 40/30* (2020.01)

(52) U.S. Cl.
CPC ......... *G06N 20/20* (2019.01); *G06F 16/9035* (2019.01); *G06F 16/90332* (2019.01); *G06F 40/30* (2020.01); *G06N 5/025* (2013.01)

(58) Field of Classification Search
CPC .............. G06N 20/20; G06F 16/90332; G06F 16/9035
See application file for complete search history.

(56) References Cited

U.S. PATENT DOCUMENTS

| 8,260,117 B1* | 9/2012 | Xu .................... H04N 21/4668 386/343 |
| 2014/0012786 A1 | 1/2014 | Coleman et al. |
| 2014/0279639 A1 | 9/2014 | Cooper et al. |
| 2015/0317376 A1 | 11/2015 | Bauer et al. |
| 2019/0108313 A1* | 4/2019 | Jarrett .................... G16H 50/20 |

OTHER PUBLICATIONS

"Intelligent Human Resource Information System (iHRIS): A Holistic Decision Support Framework for HR Excellence" Abdul-Kadar Masum et al. Aug. 12, 2015 (10 Pages).

* cited by examiner

*Primary Examiner* — Loc Tran
(74) *Attorney, Agent, or Firm* — Griffiths & Seaton PLLC

(57) ABSTRACT

Various embodiments are provided for implementing intelligent decision support system in a computing environment by a processor. Data of historical decisions may be collected and examples of decisions by domain experts may be generated. One or more machine learning models may be generated using different splits of the historical data and the annotated data. The one or more machine learning models may be combined and used to generate ensemble machine learning models that generate recommendations for the decisions. Users interact with a user interface displaying the data, recommendations, reasons for recommendations and a conversational dialog system for querying about the data, recommendations and guidance for decision making.

18 Claims, 20 Drawing Sheets

545

| Rate Us |
|---|

How would you rate your overall experience of use AcmePay?

Excellent ○   Above Average ○   Average ○   Below Average ○   Poor ○

How would you rate the AI System suggestions for helping you decide on compensation increases for your team?

Excellent ○   Above Average ○   Average ○   Below Average ○   Poor ○

Which aspects of AcmePay did you find most useful? (Please tick all relevant)

AI System Recommendations ○   User Experience ○   Team Analytics ○   Holistic Employee View ○

Which of the below statements about AcmePay do you agree with most:

○ I made better compensation decision with AcmePay than what I would have made without it
○ I made similar decisions but AcmePay helped me think through the decisions in an informed manner
○ AcmePay did not help me with my decision making Suggestions/Comments

INTELLIGENT DECISION SUPPORT SYSTEM

CROSS REFERENCE TO RELATED APPLICATIONS

This application claims priority to India Patent Application No. 201841021354 filed on Jun. 7, 2018 titled "Interactive Decision Making Support System and Method Thereof."

BACKGROUND OF THE INVENTION

Field of the Invention

The present invention relates in general to computing systems, and more particularly, to various embodiments for implementing intelligent decision support system using a computing processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments are provided for implementing intelligent decision support systems in a computing environment. The intelligent decision support system may collect and use data about historical decisions (which may have been performed by a domain expert) in those domains (e.g., historical data) and/or have domain experts generate examples of good decisions in those domains (annotated data). One or more machine learning models may be built using different splits of the historical data and the annotated data to generate recommendations for decision making. The machine learning models may be combined to build ensemble machine learning models to generate recommendations for decision making.

In addition to the foregoing exemplary method embodiment, other exemplary system and computer product embodiments are provided and supply related advantage.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5D is a diagram depicting a user interface display for collecting feedback using an intelligent decision support system in accordance with aspects of the present invention;

FIG. 7A-7C are block diagrams depicting operations for generating natural language reasons ("NLR") for explaining automatically generated machine learning recommendations from an ensemble of classifiers in accordance with aspects of the present invention;

DETAILED DESCRIPTION OF THE DRAWINGS

Figure 1:
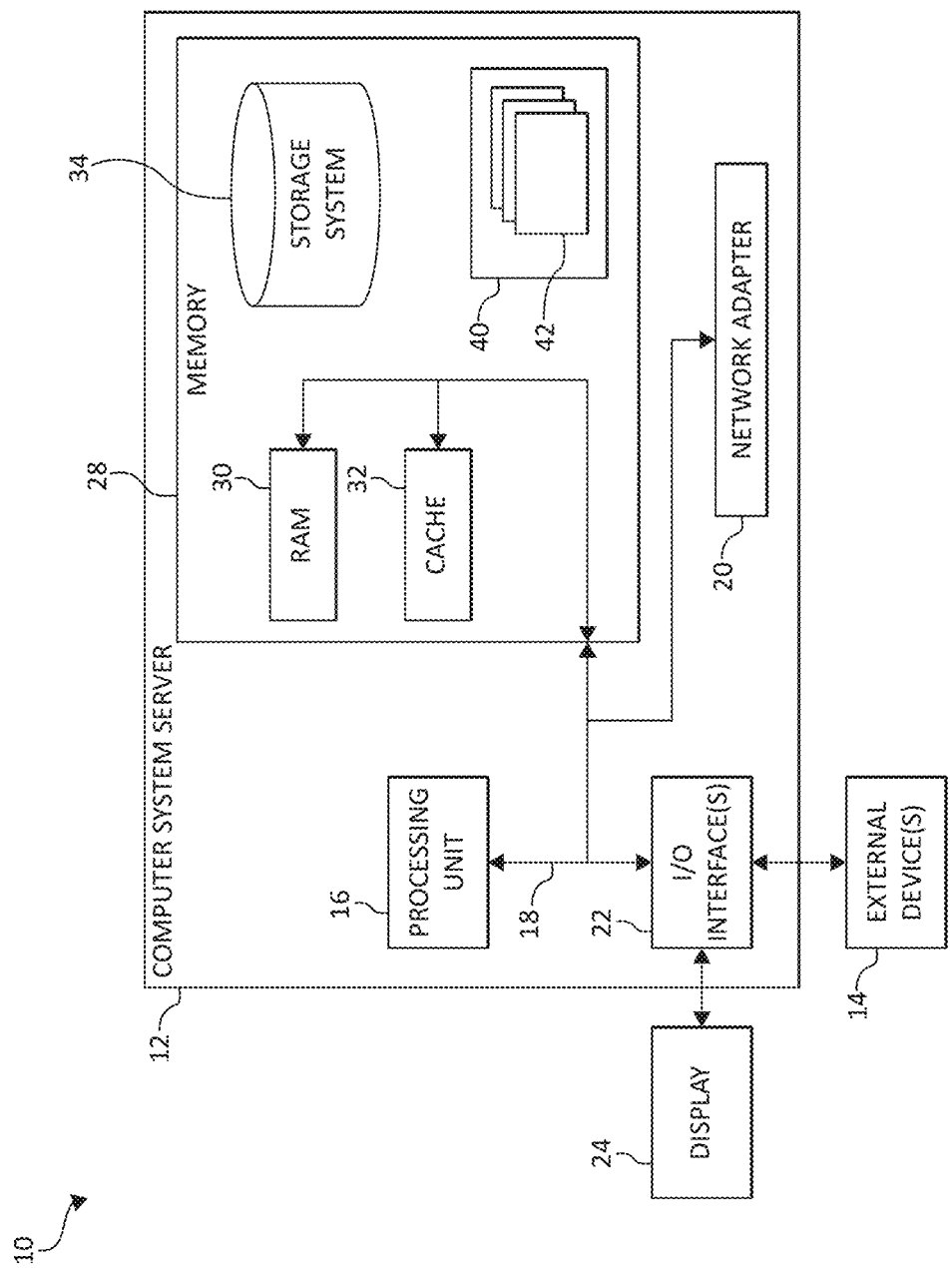
FIG. 1 is a block diagram depicting an exemplary computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, dialog systems of a computing system can play a key role in the functioning of an entity, such as a business, government, group or other organization. For example, many critical decisions may result from discussions in chat systems, or chat-like conversation systems or chatbots. A chatbot may be an operation which conducts a dialog or conversation, audible, visual, and/or via textual methods. Organizations may seek to capture and analyze these decisions to make various improvements to a structure of the organization.

Moreover, a decision support system may be provided for improving the ability of a human in making decisions assisted by machine learning generated recommendations for the decisions. For such decision support systems, it is critical that an entity (e.g., a human) trust the recommendations and for the decision support system to help generate this trust, such as, for example, in human resource ("HR")-related domains, where there is a special need to understand decisions, guidance, reasoning, etc., so that entity decision makers can trust the decision support recommendations.

Accordingly, a need exists for a decision support system that provides an integrated user experience where the recommendations are coupled with a natural language conversational dialog in an integrated user interface ("UP") to support the decision making.

Thus, the present invention provides an intelligent computing system that implements an intelligent decision support system in a computing environment. Data of historical decisions may be collected and examples of decisions by one or more domain experts may be generated. One or more machine learning models may be generated using different splits of the historical data and the annotated data. The one or more machine learning models may be combined and used to generate ensemble machine learning models that generate recommendations for the decisions. Users interact with a user interface displaying the data, recommendations, reasons for recommendations and a conversational dialog system for querying about the data, recommendations and guidance for decision making.

In an additional aspect, the intelligent decision support system may collect similar data according to historical data and annotated data. One or more prediction models may be generated using different splits of the similar data. The one or more prediction models may be combined and used to generate a decision model using one or more machine learning operations.

In an additional aspect, the intelligent decision support system may be an intelligent/cognitive decision support system that assists supervisors/managers of an entity with compensation decisions by recommending one or more actions for one or more selected users/employees according to a complete profile/understanding of the employee such as, for example, job performance, skills and/or sets of skills, talents, abilities, competitiveness of the user/employees' compensation, compensation history, promotions/advancements, prior employments, and/or other historical data pertaining to the user.

The intelligent decision support system may include a machine learning component/mechanism to generate one or more recommendations to increase the intelligence, reasoning, and effectiveness of various users (e.g., administrators, supervisors, managers, etc.) making decisions that may influence one or more outcomes such as, for example, increasing competitiveness of compensation, investing in skilled employees, reducing attrition of experienced and/or highly-skilled employees.

As an additional aspect, the present invention provides for an intelligent decision support system having an integrated user interface ("UP") for one or more decisions (e.g., HR based decisions) with machine learning recommendations, evidence, and reasons supporting the recommendations. A conversational dialog/chatbot in the intelligent decision support system may be used to engage in a dialog (e.g., question/answer dialog) pertaining to one or more of the decisions, recommendations, guidance, etc.

In one aspect, the intelligent decision support and UI system may include/provide the following features and/or functionality. First, one or more recommendations for decisions may be generated from a machine learning model. Second, one or more analytics that dynamically analyze human decisions may be used to provide various types of decisions/suggestions. Third, analytics suggesting evidence and reasons for each recommendation may also be provided. Fourth, a natural language conversational chatbot may be used for answering (e.g., in real-time) any user queries pertaining to information related to the decisions, reasons behind recommendations, guidance for decision making, etc. Fifth, the intelligent decision support and UI system may include/provide the ability for selected personnel/managers to enter and/or validate various levels of skills and expertise levels for those persons the selected personnel/managers have direct responsibility over and to aid in the decision making. Sixth, the intelligent decision support and UI system may group employee attributes to reflect one or more priorities of an entity (e.g., salary program objectives) in terms of directions for the corresponding decisions.

In an additional aspect, the present invention provides for an intelligent decision support system using one or more machine learning models (e.g., decision trees or an ensemble of decision trees) that may output, for each data point, a class label. However, some application domains (e.g., HR-related domains such as, for example, compensation decision making based on varied employee data) need an ability to explain and interpret a chain of reasoning used by artificial intelligence "AI" and/or machine learning models to arrive at recommendations. Thus, the present invention provides one or more machine learning models (e.g., decision tree models) with a chain of reasoning (a complete machine learning path in the case of decision trees) followed by the machine learning models for every data point to generate recommendations, which may be in a user consumable format (e.g., natural language format). In this way, a user is enabled to understand the decision (e.g., a class label) as well as the path/rules followed to reach the decision in a natural language format.

In specific instances, where an ensemble of decision trees is used to generate recommendations, the present invention provides a computing system that generates a full/complete path taken for each input data point across an ensemble of machine learning models to generate the final recommendation (decision). In one aspect, the decision path for each of the decision trees in the ensemble of machine learning models may be determined/computed. For each decision tree in the ensemble of machine learning models, the present invention may linearize a complete decision tree into a set of machine learning rules where each set corresponds to a single path taken from a root node to the leaf (decision) node of the decision tree.

For each input data point, the present invention may compare the values of the attributes of the data point against each of the machine learning rules to identify a single unique path corresponding to the data point from the root node to the leaf node(s) of the decision tree. The single, unique path may be a set of individual machine learning rules. For each machine learning rule in the single, unique path, the present invention may apply an appropriate natural language rule that factors in the machine learning rule as well as an eventual decision of the machine learning path. From an ensemble of decision trees, the present invention may apply a voting approach to select a set of relevant decision trees. The present invention may concatenate the natural language reasons across all selected decision trees to generate a holistic set of reasons for each final recommendation (e.g., decision).

In an additional aspect, unlike most chatbots that are only based on static, unstructured content, for a selected domain (e.g., a HR domain), the present invention provides one or more customized/personalized dialog systems/chatbots that are enabled to answer one or more queries/questions against both structured and unstructured data and provide both customized/personalized information specific to a user (e.g., an employee) as well as generalized information for different groups of users (e.g., employees). For example, a chatbot as part of an intelligent decision support system (e.g., an intelligent HR decision support system) may provide personalized information about specific employees as well as generic guidance about an employee program applicable to all employees.

In one aspect, the intelligent decision support system provides as input a structured database of user information (e.g., a structured HR database of employee information), guidelines and information of an entity (e.g., General HR guidelines and information) such as, for example compensation planning. The intelligent decision support system may provide as output, using a dialog system/chatbot (e.g., a conversational chatbot), one or more selected users that are automatically identified (e.g., employees identified from a query). The intelligent decision support system may detect the intent of the communication in the chatbot and fetches the information to answer the query of the chatbot. Thus, the present invention combines structured and unstructured data, customized/personalized information, and information in the chatbot (e.g., a HR chatbot). The present invention may also provide a customized/personalized chatbot that contextually detects a user relating to a query (e.g., an employee being asked about to) so as to retrieve/fetch relevant information pertaining to the user. The data relating to the query may be retrieved/fetched from a selected database having a domain knowledge (e.g., an employee database or HR knowledgebase).

In one aspect, the intelligent decision support system may use one or more machine learning models for generating compensation suggestions to one or more users (e.g., managers). To build accurate machine learning models, training data may be used. The training data sources may be historical data (e.g., previous historical data relating to compensation decisions) and/or annotated data (e.g., data annotated by a domain expert that may be coded as examples.

The historical data may be a collection of historical decisions along with a variety of data pertaining to decision making. The historical data may be analyzed, selected, and sampled according to the context and needs/requirements of the decision making. A degree of importance of different attributes may be determined and analyzed since the degree of importance of different attributes may change over time. Moreover, the historical data may include data attributes for one or more users (e.g., employees for HR use cases) at the time of historical decision making, since the data attributes may change over time.

The annotated data may be a collection of examples/samples of decisions made by one or more domain experts, which may be for the intended/sole purpose of improving the machine learning models. In one aspect, the annotated data by domain experts may be generated in an environment/setup that is as close as possible to the actual decision making environment/setup. The domain experts may be carefully sampled from a plurality of domain experts in decision making context (e.g., HR compensation experts) as well as sampling of decision makers.

In an additional aspect, the mechanism of the illustrated embodiments may utilize machine learning for one or more applications for one or more entities and domains (e.g., various industries and domains). Supervised machine learning operations require labelled data. However, it is often costly and time consuming to generate labeled data for a particular application. Often, labeled data sets may be available that may not be exact or precise/perfect fits for a given application. For example, for a HR decision making scenario, though data about historical HR decisions may be available, such data may not be an appropriate and/or perfect fit for a current decision process since the criteria/context of the decision process now may have shifted in an organization. If more precise, appropriate, and/or specific examples that fit the application/decision making context can be harvested/separated from these other data sets, the data may boost and/or optimize accuracy of a machine learning model. Thus, the intelligent decision support system may provide as input an annotated, labeled, data set matching a machine learning requirement and/or other labeled data sets that are not a perfect match for a current machine learning requirement.

The intelligent decision support system may provide as output a selection of specific examples from other data sets that are best fits (e.g., optimal fit) for the current machine learning requirement, thus boosting accuracy of machine learning modeling. For example, the intelligent decision support system may select data samples from a data set B based on similarity to data set A for use by a specific machine learning application that is closely aligned with data set A. Such operations may be used by combining historical data about historical decisions (e.g., manager decisions) with current annotation data (from a domain expert). The intelligent decision support system may identify a degree of matching between a data point in a data set B with a data point in a data set A. A sample from data set B may be selected that is "similar" to data set A. A machine learning model may be trained by combining data set A and the selected sample from data set B.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
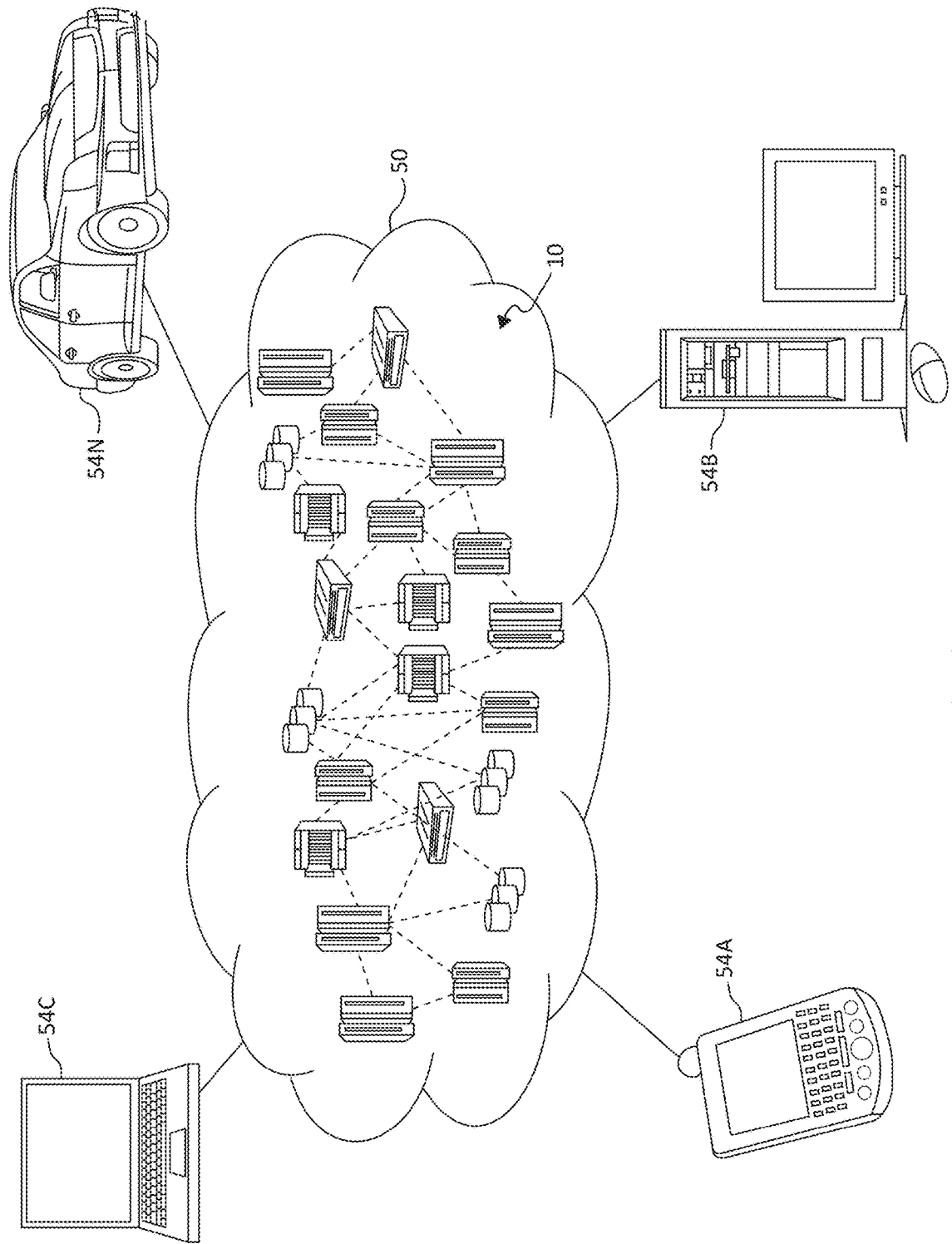
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or other type of computer systems 54N (e.g., a smart watch, biometric sensor, health state monitoring computer system, etc.) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
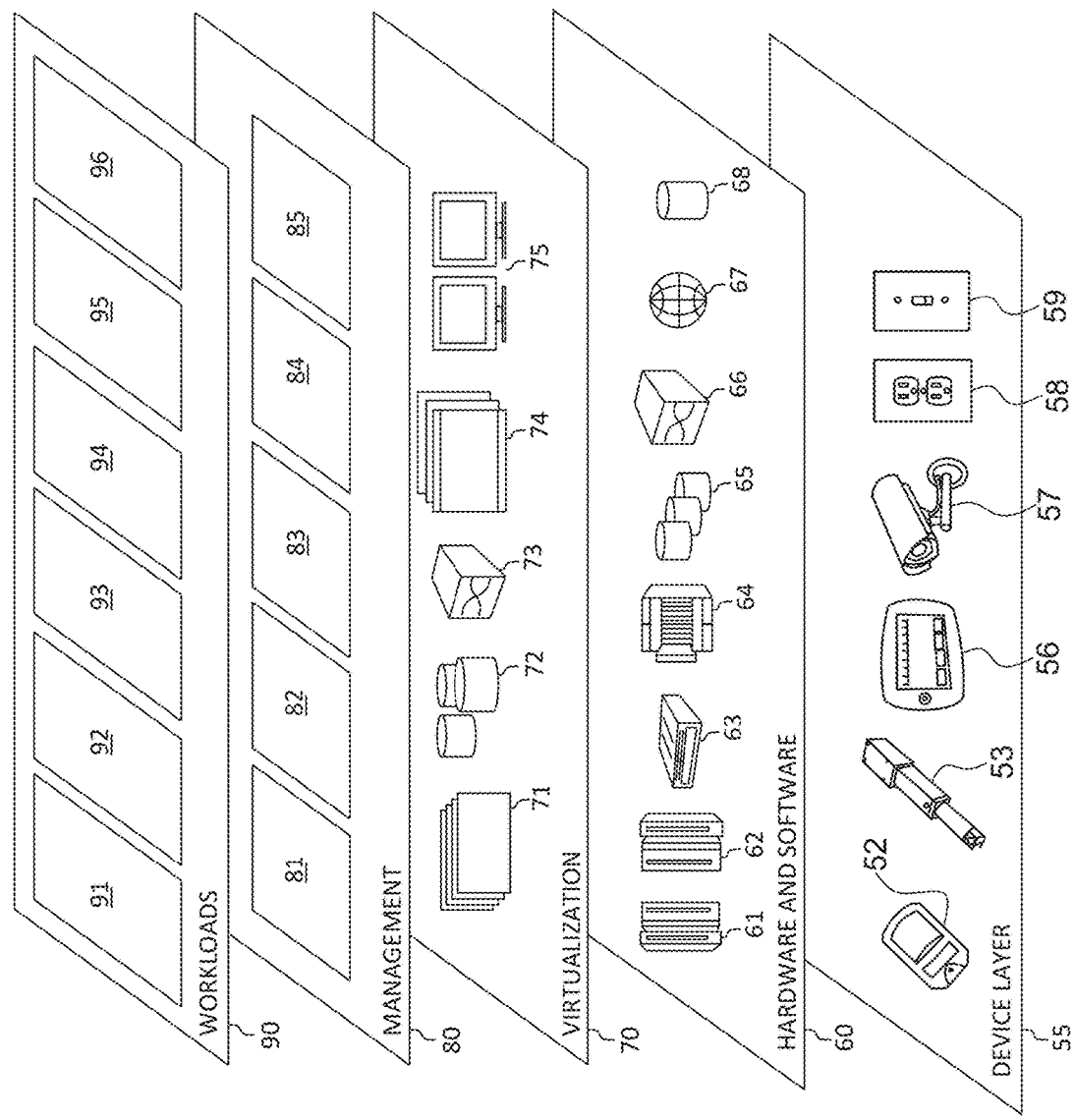
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for using an intelligent decision support system. In addition, the workloads and functions 96 for using an intelligent decision support system may include such operations as data analytics, data analysis, and as will be further described, notification functionality. One of ordinary skill in the art will appreciate that the workloads and functions 96 for using an intelligent decision support system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
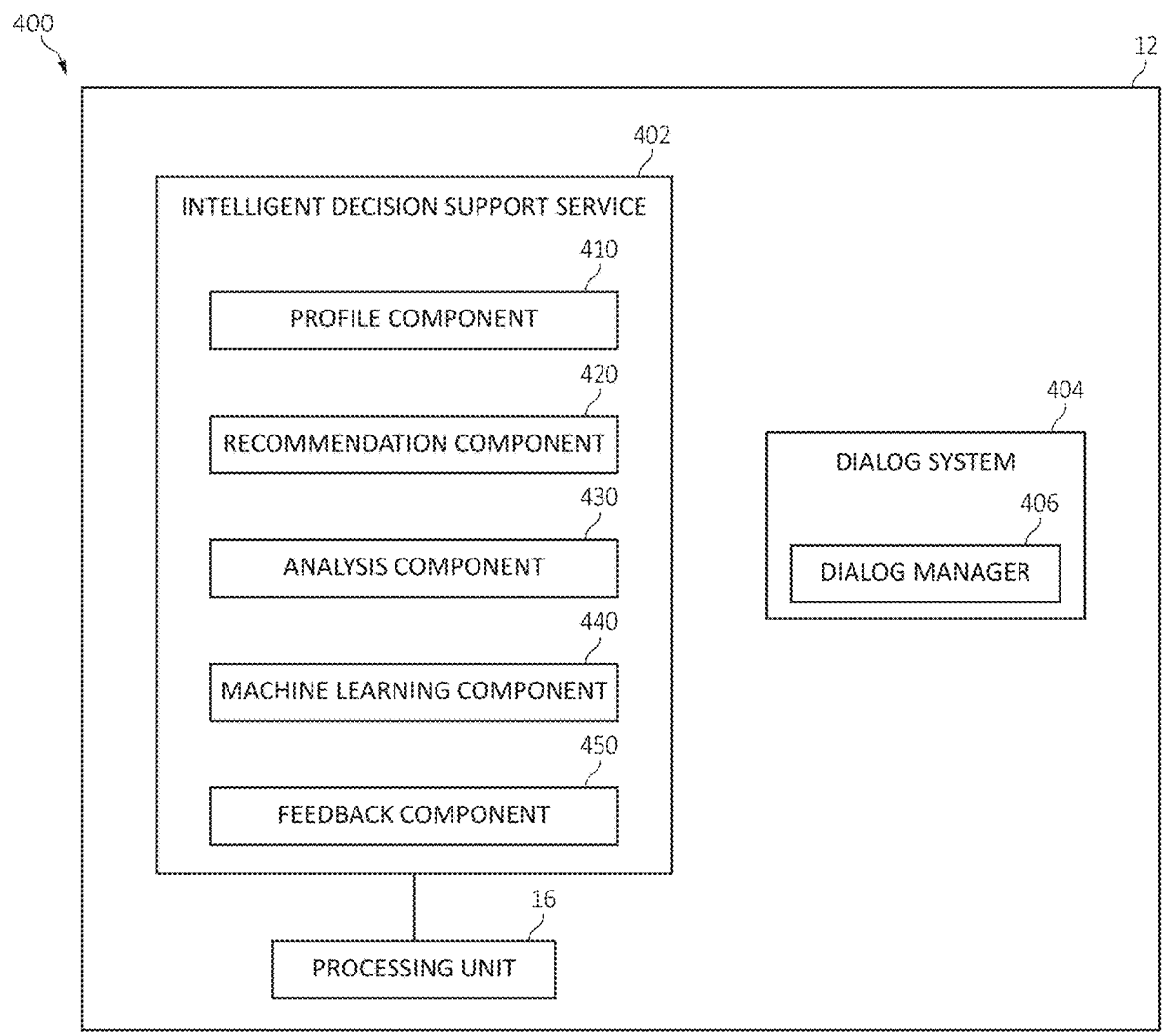
FIG. 4 is an additional block diagram depicting an exemplary functional relationship between various aspects of the present invention.

Turning now to FIG. 4, a block diagram depicting exemplary functional components of an intelligent decision support system 400 according to various mechanisms of the illustrated embodiments is shown. FIG. 4 illustrates workloads and functions for implementing the intelligent decision support system 400 in a computing environment. As will be seen, many of the functional blocks may also be considered "modules" or "components" of functionality, in the same descriptive sense as has been previously described in FIGS. 1-3. With the foregoing in mind, the module/component blocks may also be incorporated into various hardware and software components of a system for implementing the intelligent decision support system 400 in accordance with the present invention. Many of the functional blocks of the intelligent decision support system 400 may execute as background processes on various components, either in distributed computing components, or on the user device, or elsewhere.

Computer system/server 12 is again shown, incorporating processing unit 16 (and memory 28 of FIG. 1 and not shown in FIG. 4 for illustrative convenience) to perform various computational, data processing and other functionality in accordance with various aspects of the present invention.

The intelligent decision support system 400 (e.g., artificial intelligence "AI" service) may include an intelligent decision support service 402 and a dialog system 404. The intelligent decision support service 402 may include a profile component 410, a recommendation component 420, an analysis component 430, a machine learning component 440, and/or a feedback component 450.

The intelligent decision support service 402 and the dialog system 404 may each be associated with and/or in communication with each other, by one or more communication methods, such as a computing network. In one example, the intelligent decision support service 402 and the dialog system 404 may be controlled and/or used by an owner, user/customer (e.g., a manager of a business and/or employed by the business), or technician/administrator associated with the computer system/server 12.

In one aspect, the computer system/server 12 may provide virtualized computing services (i.e., virtualized computing, virtualized storage, virtualized networking, etc.) to the intelligent decision support service 402 and the dialog system 404. More specifically, the computer system/server 12 may provide virtualized computing, virtualized storage, virtualized networking and other virtualized services that are executing on a hardware substrate.

The profile component 410 may provide a collection of data (e.g., historical data) pertaining to each user. In one aspect, the data may include user data for a particular employee, manager/leader, and/or executive for an entity (e.g., a business, academic institution, organization, governmental institution, etc.). For example, user data for an employee may include a holistic view of the employees' performances, skills, compensation, salary competitiveness, attrition risk, and/or employment/career potential.

The machine learning component 440, along with the recommendation component 420 may collect similar data according to historical data and annotated data, which may be stored in the profile component 410.

The machine learning component 440 may learn, train, and/or generate one or more prediction models using different splits of the similar data. The machine learning component 440, along with the recommendation component 420, may combine the one or more prediction models to generate a decision model using one or more machine learning operations. The machine learning component 440, along with the recommendation component 420, using the decision models, may provide one or more recommendations pertaining to a selected user (e.g., an employee) that may prioritize one or more selected factors pertaining to employment (e.g., salary prioritization) along with providing supporting analytics, reasons, and/or evidence that supports the reasons.

The analysis component 430 may analyze data and each of the decisions for a selected user (e.g., a user). For example, the analysis component 430 may provide analytics on decisions for a manager and/or a team within a business to assist a manager to analyze salary and/or salary program objectives. Thus, the analysis component 430 may identify one or more reasons for each of the decisions for a selected user.

Thus, the machine learning component 440, along with the recommendation component 420, may assist with providing decisions (e.g., compensation decision) and support of each decision such as, for example, by recommending personalized actions based on a complete understanding of each user/employee based on performance, compensation competitiveness, skills and career potential.

The machine learning component 440, along with the recommendation component 420, may combine the structured and unstructured data from one or more data sources and customize communications in the dialog system 404 according to the structured and unstructured data.

The machine learning component 440, along with the recommendation component 420, may interpolate the historical data and the annotated data using an ensemble of classifiers. The machine learning component 440, along with the recommendation component 420, may select the annotated data from a data set based on a degree of similarity with one or more alternative data sets. The machine learning component 440, along with the recommendation component 420, may explain one or more recommendations from the one or more prediction models according to a natural language operation.

In an additional aspect, the machine learning component 440, along with the recommendation component 420, may 1) collect the historical data, 2) collect the annotated data from one or more domain experts, 3) derive the different splits of both the historical data and the annotated data, and/or 4) determine one or more features from one or more attributes of a selected entity from similar data fields of the different splits.

In one aspect, the machine learning component 440 may be initiated to perform one or more machine learning operations to perform a semantic analysis, train a classifier, learn one or more machine learning rules, learn contextual data associated with the dialog system, learn and train the one or more prediction models using the historical data and the annotated data, generate one or more recommendations or predictions from the one or more prediction models, and assist with engaging in communication using the dialog system, or perform a combination thereof.

The machine learning component 440 may perform one or more machine learning operation and learn information based on the feedback collected from one or more users via the feedback component 450. For example, one or more users may engage the dialog system and the feedback component 450 may provide feedback to assist the analysis component 430 with one or more reasons, evidences, or justification for identifying the positive and/or negative sentiment of a user. The feedback component 450 may store the feedback information in a database/memory and may use the feedback data to learn.

The machine learning component 440 may perform one or more machine learning operations such as, for example, using natural language processing (NLP) and artificial intelligence (AI) for performing one or more operations as described herein and for engaging in communication with a user via the dialog system 404. The instances of the NLP or AI may include an instance of IBM® Watson®. (IBM® and Watson® are trademarks of International Business Machines Corporation).

The machine learning component 440 may perform a machine learning operation for training and learning one or more machine learning models and also for learning, applying inferences, and/or reasoning pertaining to one or more users. For example, the machine learning component 440 may data to train a classifier of the recommendation component 420 and/or analysis component 430.

In one aspect, the learning component 440 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Turning now to FIGS. 5A-5E, various displays (e.g., a user interface/graphical user interface "GUI") of a dialog system are depicted using the intelligent decision support system 400 of FIG. 4. In one aspect, many of the functional blocks previously described in FIGS. 1-4 may be applied and used for executing one or more operations and/or functionality described in FIGS. 5A-5E. Repetitive description of like elements, components, modules, services, applications, and/or functions employed in other embodiments described herein is omitted for sake of brevity.

Figure 5A:
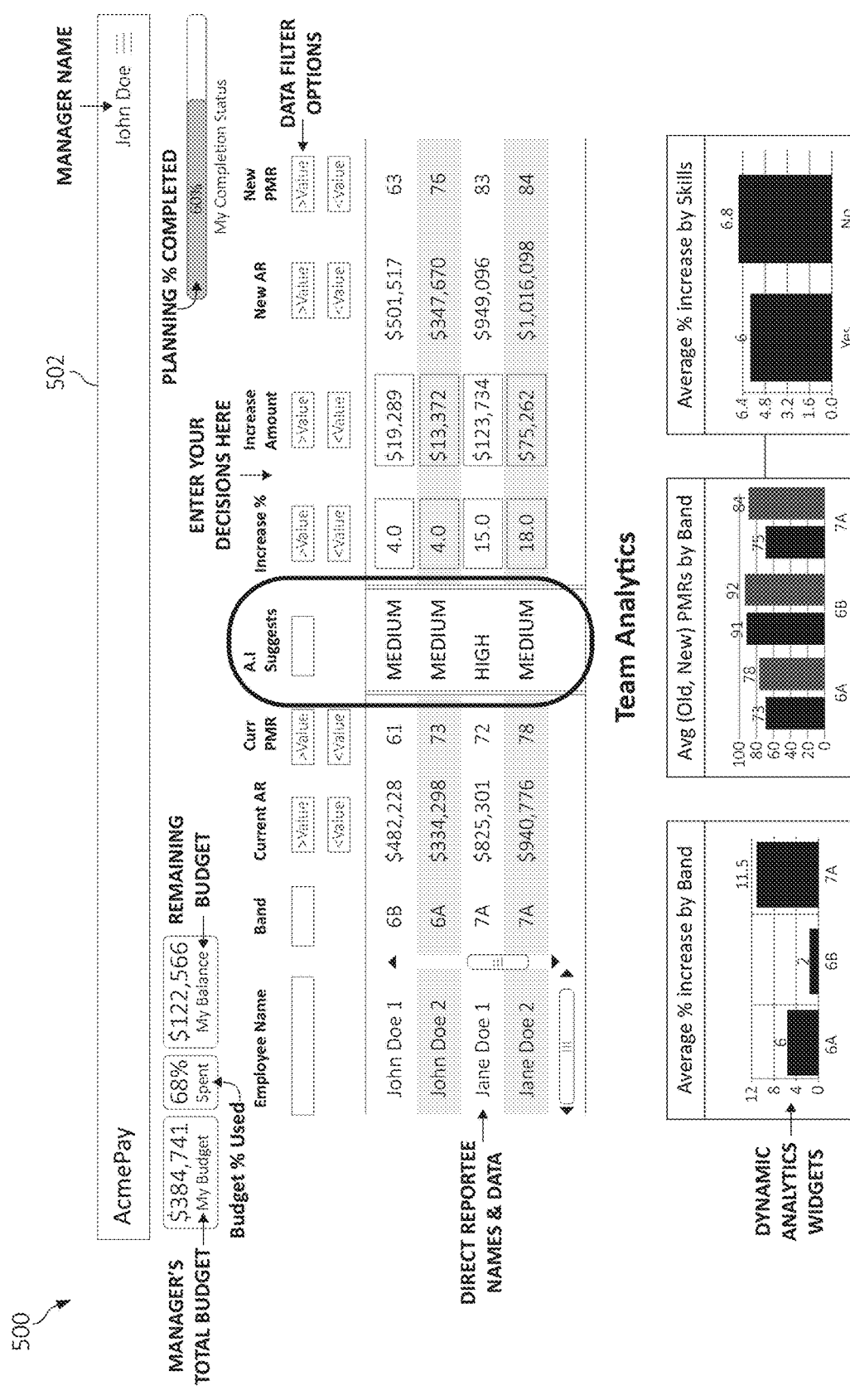
FIG. 5A is a diagram depicting a user interface display for an administrator using an intelligent decision support system in accordance with aspects of the present invention.

Turning now to FIG. 5A, diagram 500 illustrates a display 502 (e.g., a user interface/graphical user interface "GUI") for an administrator (e.g., a home screen for a manager of a business) using the intelligent decision support system 400 of FIG. 4. For example, the display 500 may indicate a budget, a percentage of the budget used, a remaining amount of the budget, direct reportee/employee names and data, a dynamic analytics widget (e.g., products/services) (e.g., for team analytics), a percentage of planning completed, a name of an administrator/supervisor/manger, an entry section for one or more decisions, data filter options, and/or a plurality of other customizable fields, attributes, or desired display features for using the intelligent decision support service 402 and the dialog system 404 of FIG. 1.

Figure 5B:
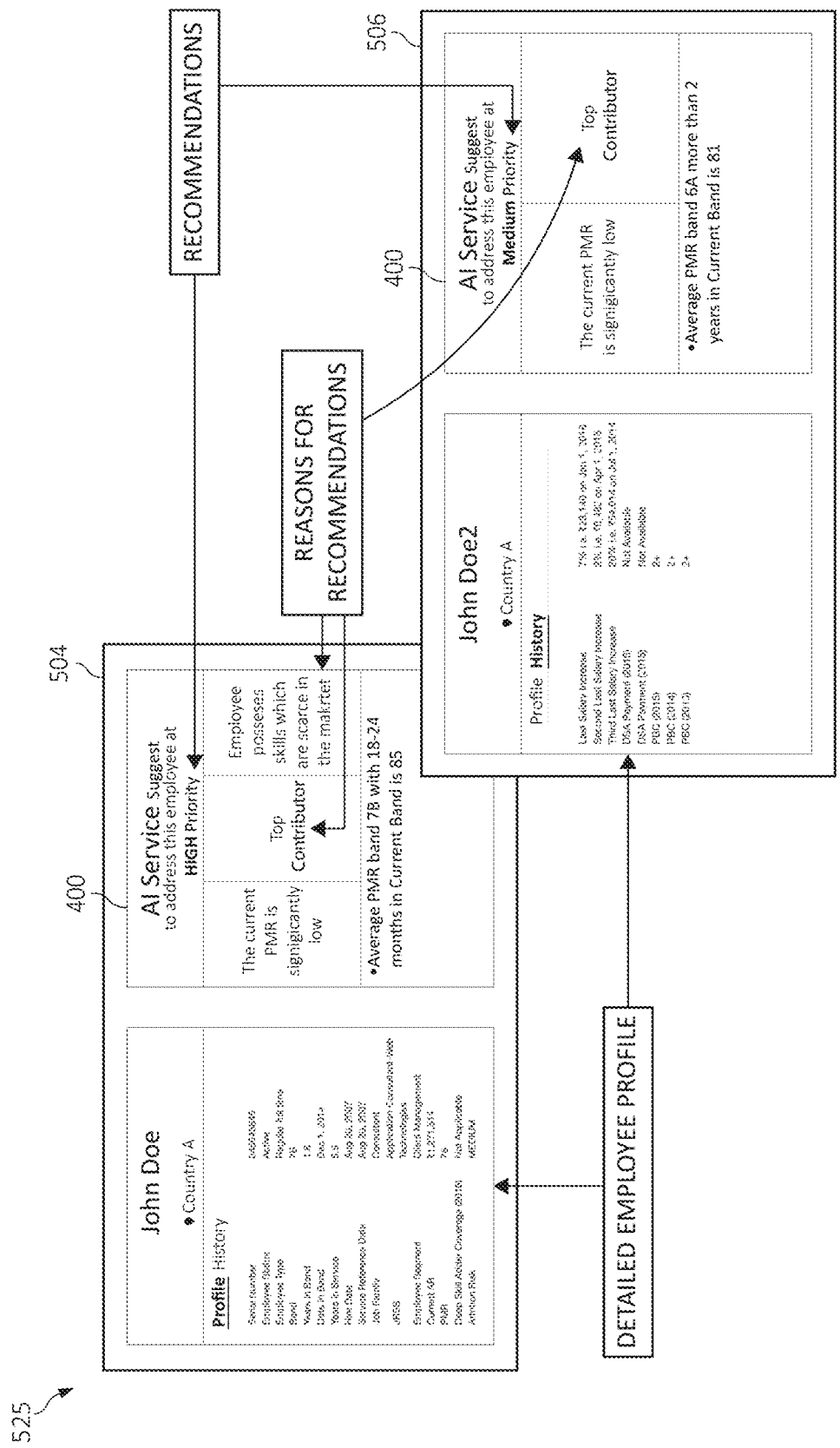
FIG. 5B is a diagram depicting a user interface display for a user using an intelligent decision support system in accordance with aspects of the present invention.

Turning now to FIG. 5B, diagram 525 illustrates displays 504 and 506 (e.g., a user interface/graphical user interface "GUI") for one or more users (e.g., a home screen for an employee of a business) using the intelligent decision support system 400 of FIG. 4. For example, using the intelligent decision support system 400 of FIG. 4, the displays 504 and 506 are provided for one or more selected users such as, for example, employee John Doe 1 and John Doe 2. That is, the intelligent decision support system 400 may provide the displays 504 and 506 with a user profile (e.g., a detailed employee profile for John Doe 1 and/or John Doe 2), one or more recommendations, and/or one or more reasons/justifications for the one or more recommendations. For example, the intelligent decision support system 400 may recommend that John Doe 1 is a top contributor and an "employee that possess skills which are scarce in the market" and "the current PMR (e.g., a salary competitiveness measure) is significantly low". Thus, the intelligent decision support system 400 (e.g., artificial intelligence "AI" service) recommends a high priority for John Doe 1 to have a compensation (e.g., salary/wage) increase. Alternatively, the intelligent decision support system 400 may recommend that John Doe 2 is a top contributor and the current PMR is significantly low. Thus, the intelligent decision support system 400 recommends a medium priority for John Doe 2 to have a compensation (e.g., salary/wage) increase.

Figure 5C:
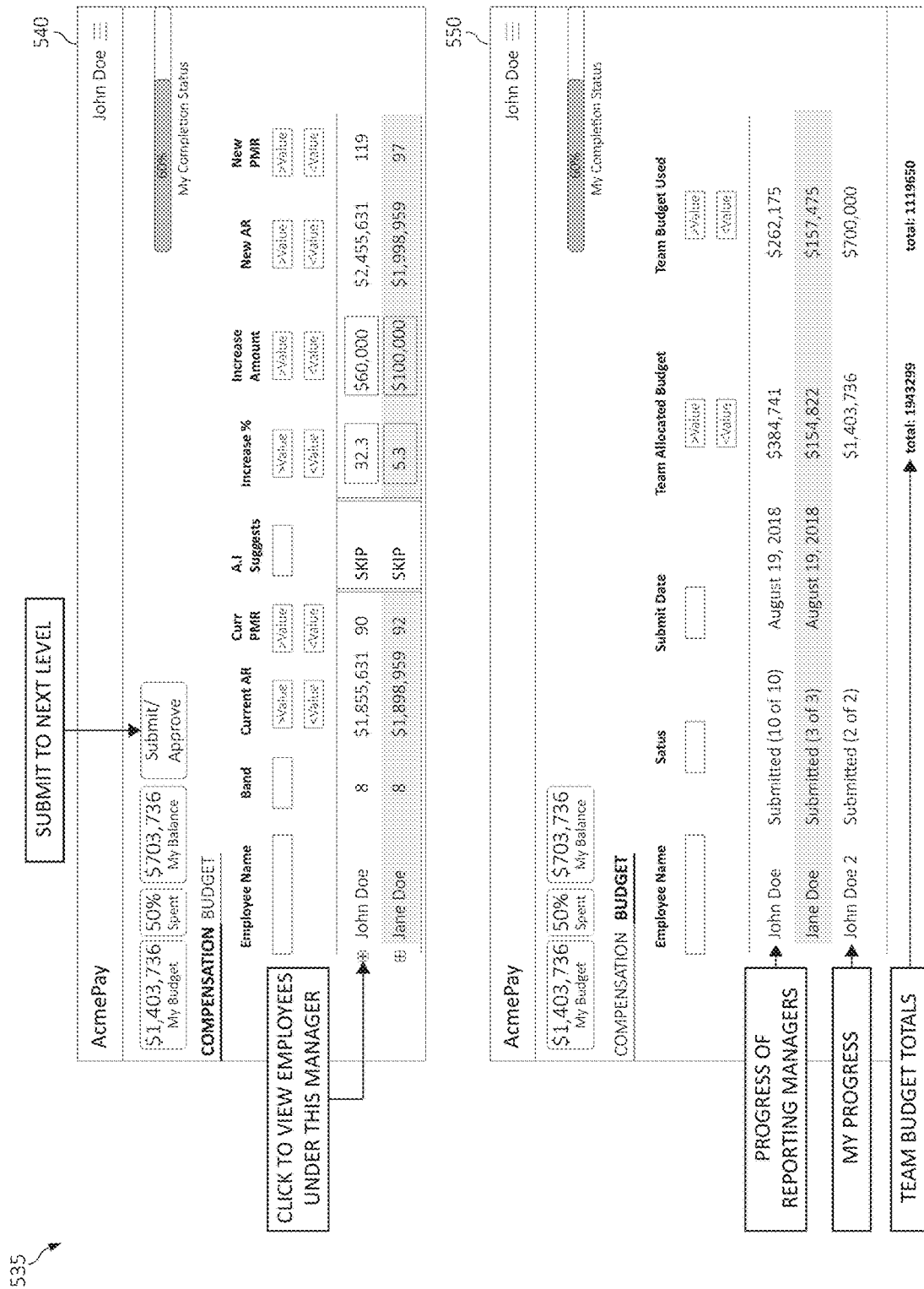
FIG. 5C is a diagram depicting a user interface display for a senior administrator using an intelligent decision support system in accordance with aspects of the present invention.

Turning now to FIG. 5C, diagram 535 illustrates displays 540 and 550 (e.g., a user interface/graphical user interface "GUI") for one or more senior administrator (e.g., a GUI displaying compensation data "compensation view" and budget data "budget view" for a senior manager of a business) using the intelligent decision support system 400 of FIG. 4. For example, using the intelligent decision support system 400 of FIG. 4, the display 540 depicts the ability to select/view one or more employees that may be assigned under a selected administrator (e.g., manager) and display corresponding user profile data (e.g., compensation) and recommendations. The display 550 depicts the progress of one or more reporting managers and progress of the user (e.g., user/manager) along with a selected group of the user (e.g., budget totals of the team) for an overall budget. The using the displays 540 and 550 may also enable the selected administrator to submit/approve one or more suggested recommendations (e.g., submit/approve a budget).

Turning now to FIG. 5D, diagram 545 illustrates displays 547 (e.g., a user interface/graphical user interface "GUI") for collecting feedback using the intelligent decision support system 400 of FIG. 4. For example, using the intelligent decision support system 400 of FIG. 4, the display 547 depicts a series of questions and associated options/answers for collecting feedback. For example, the display 547 may collect reasons, evidences, or justification for rating an overall experience using the intelligent decision support system 400, reasons, evidences, or justification for rating for assistance in determining a decision (e.g., a decision to provide compensation raises), rating the intelligent decision support system 400, rating an overall experience using the intelligent decision support system 400, and/or collect/receive suggestions and/or comments. The displays 547 may collect and/or store the feedback information in a database/memory associated with the intelligent decision support system 400 of FIG. 4 and may use the feedback data to learn, train, and/or increase a degree of accuracy for a prediction model.

Figure 5E:
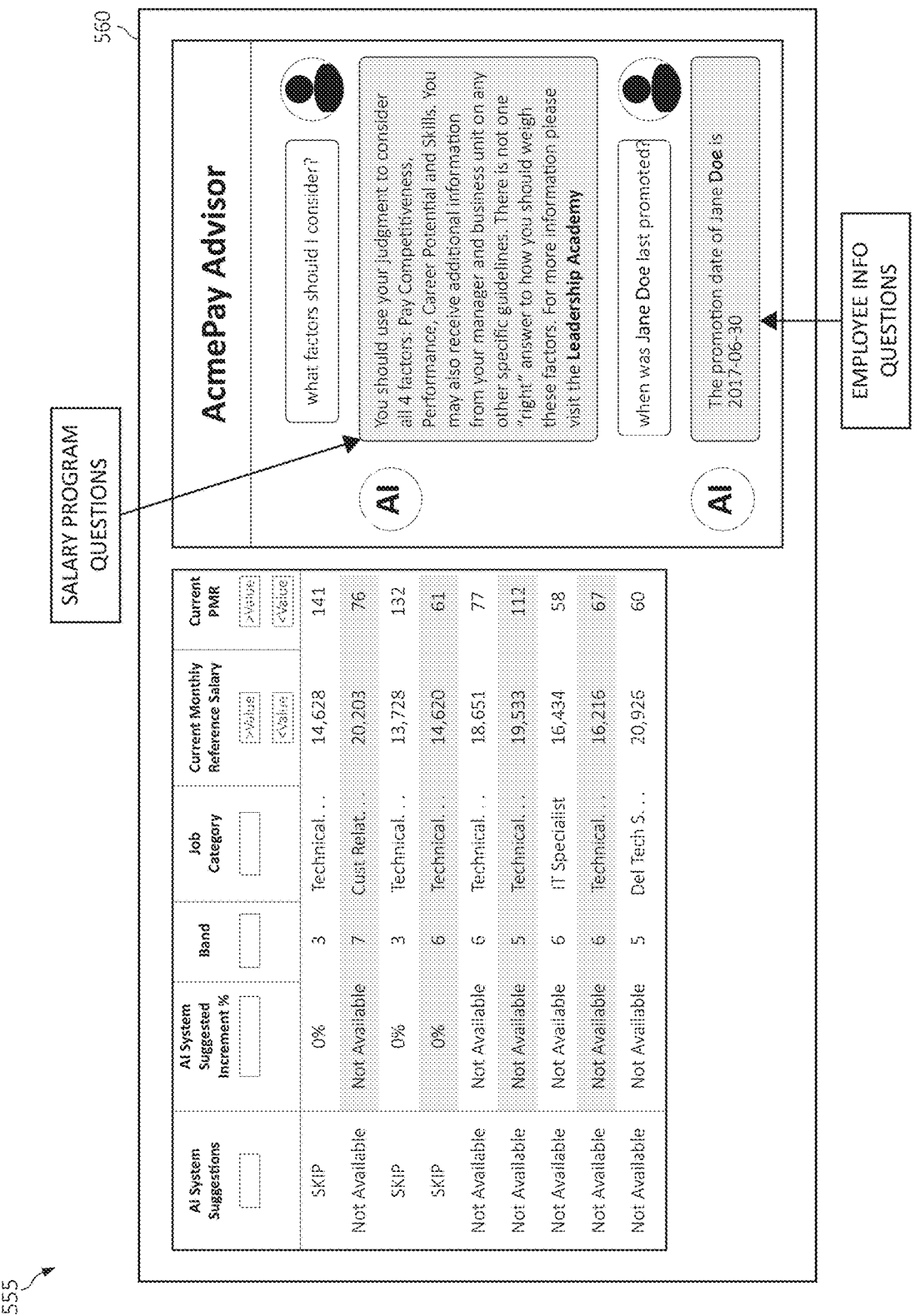
FIG. 5E is a diagram depicting an integrated dialog system using the intelligent decision support system in accordance with aspects of the present invention.

Turning now to FIG. 5E, diagram 555 illustrates display 560 (e.g., a user interface/graphical user interface "GUI") integrating a dialog system (e.g., chatbot) such as, for example, the dialog system 404 of the intelligent decision support system 400 of FIG. 4. In one aspect, by way of example only, the intelligent decision support service 402 (e.g., dialog advisor) may be included in the display 560 and provide one or more suggestions/recommendations. For example, the suggestions/recommendations may include one or more factors that should be included in a decision such as for example: compensation competitiveness, career potential and skills, additional information from one or more associates (e.g., managers), and/or historical data (e.g., dates of previous promotions/compensation raises). Thus, the dialog system 404 of the intelligent decision support system 400 illustrated in display 560 may include one or more employee questions/queries and/or one or more compensation/salary program questions/queries.

Figure 6:
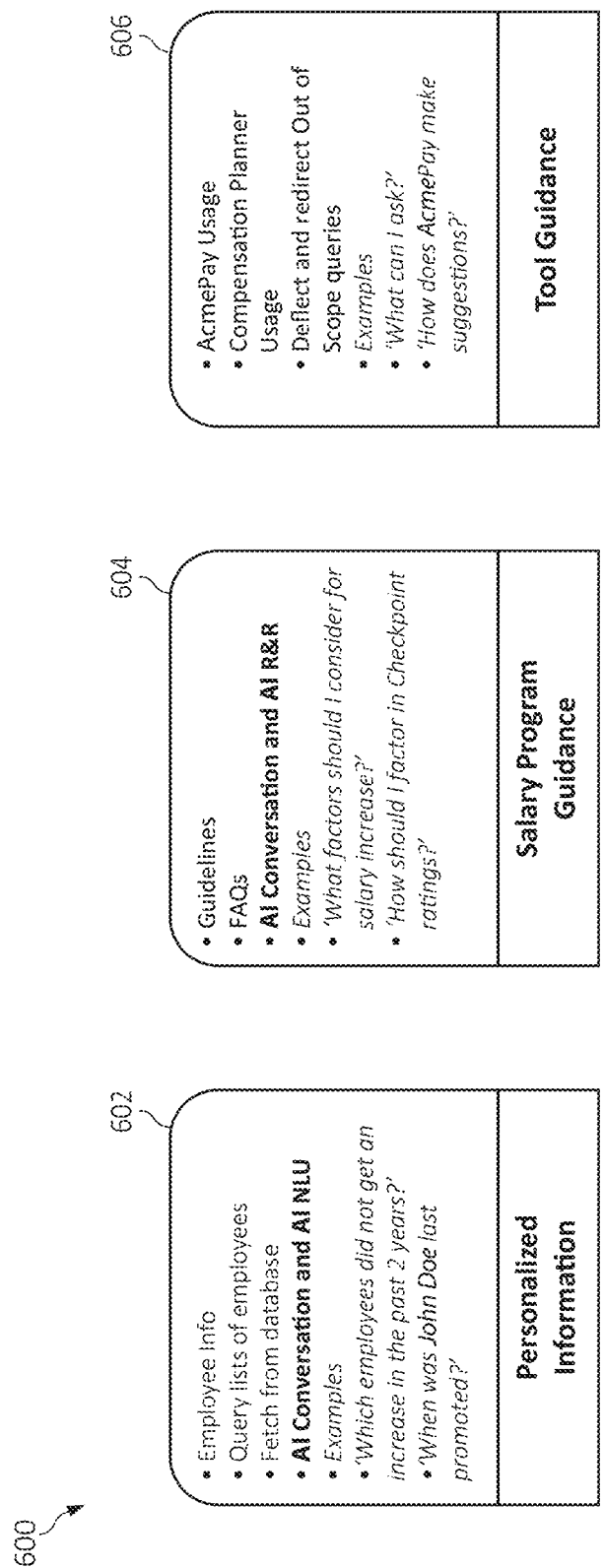
FIG. 6 is a diagram depicting an integrated dialog system complementing the intelligent decision support system in accordance with aspects of the present invention.

Turning now to FIG. 6 is a diagram 600 depicting operations of an integrated dialog system complementing the intelligent decision support system. In one aspect, many of the functional blocks previously described in FIGS. 1-5A-5E may be applied and used for executing one or more operations and/or functionality described in FIG. 6. Repetitive description of like elements, components, modules, services, applications, and/or functions employed in other embodiments described herein is omitted for sake of brevity.

The intelligent decision support system 400 using a dialog system 404 of FIG. 4 may be a customized/personalized conversational advisor that may access and retrieve personalized information 602 (e.g., employee information), guidance data 604 (e.g., compensation/salary program guidance data), and issue a query using tool guidance 606.

The dialog system 404 may access the personalized information 602 that may include user information (e.g., employee information). The dialog system 404 may query a list of users/employees that may be fetched/retrieved from a database. For example, the dialog system 404 may issue a query for the personalized information 602 such as, for example, "which employees did not get an increase in the past 2 years?" and "when was John Doe last promoted." The dialog system 404 may issue a query to the guidance data 604 such as, for example, "what factors should I consider for a salary increase?" or "how should I factor in checkpoint ratings." The dialog system 404 may issue a query to the tool guidance 606 such as, for example, "what can I ask?" or "how does the intelligent decision support system 400 make suggestions?"

It should be noted that the present invention may use machine learning to combine different machine learning models to enhance the performance of the individual models. In one embodiment, ensemble models may be used, which are a set of models whose individual predictions are combined in a way that provides more accurate classification than the individual models in the ensemble. For example, by using a 'majority voting' approach for combining the output of several constituent models, an ensemble model can 'pick' the more reliable models and 'ignore' the less reliable models for specific data points and thus increase the overall accuracy.

Additionally, a decision tree may be a class discriminator that recursively partitions a training set until each partition consists entirely or dominantly of records from the same class. The decision tree may have a root node, interior nodes, and multiple leaf nodes where each leaf node is associated with the records belonging to a record class. Each non-leaf node of the tree contains a split point which is a test on one or more attributes to determine how the data records are partitioned at that node. Thus, as used herein, in the context of a selected domain (e.g., an HR domain), compensation decisions that are typically complex and are based on understanding different types of employee data (e.g., skills, last increases, propensity to leave, performances, etc.), the machine learning model can assist a domain experts by capturing different pieces of data and deriving an appropriate decision such as, for example, with respect to compensation where a compensation decision is required based on data for each user/employee. A decision trees may be employed to assist in a decision (e.g., high/medium/low-rated decision) for each user/employee. An ensemble of multiple decision trees may also be used to test the impact of different attributes/features. That is, a decision tree ensemble may be an ensemble classifier that may include a collection of decision trees.

Figure 7A:
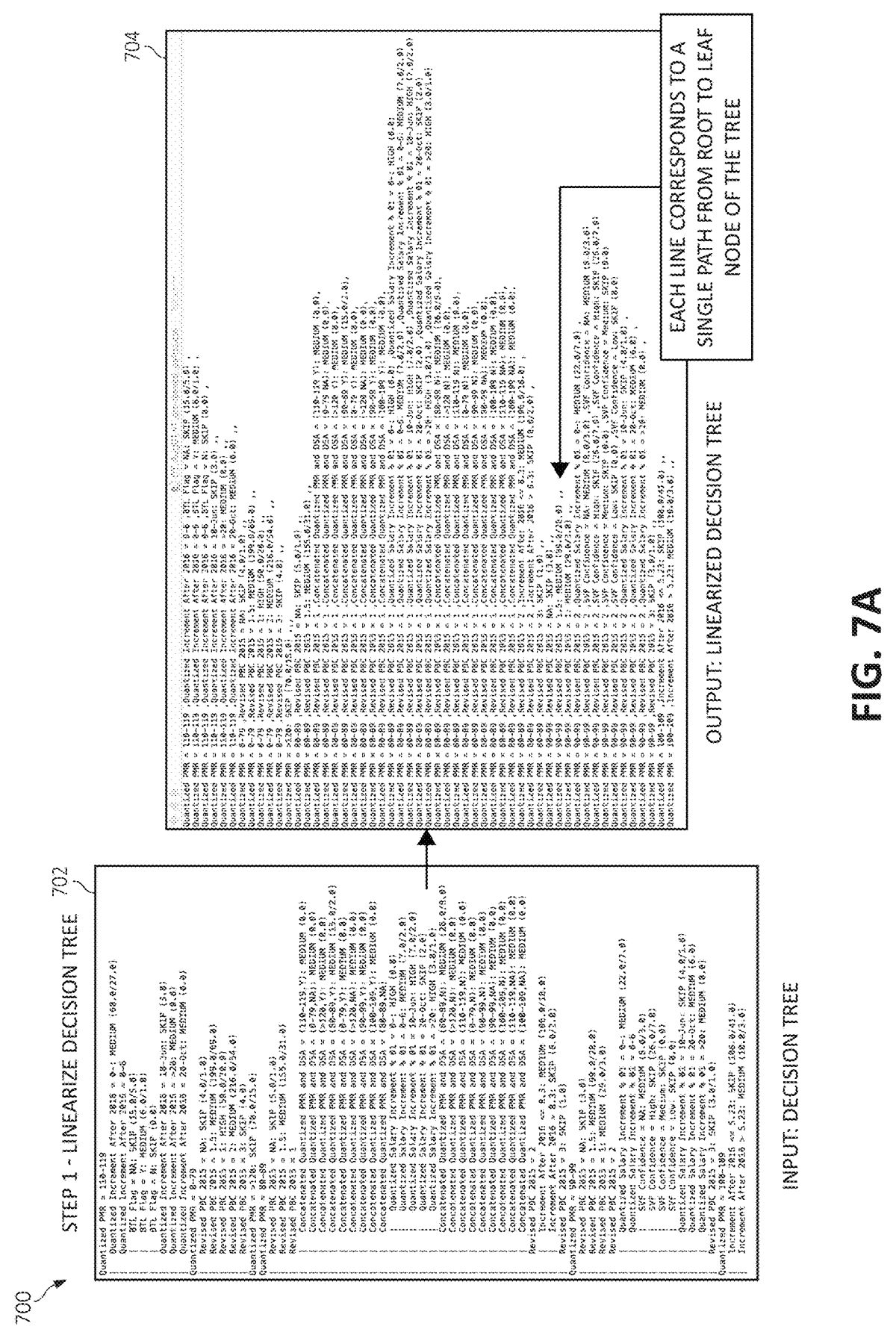
Figure 7B:
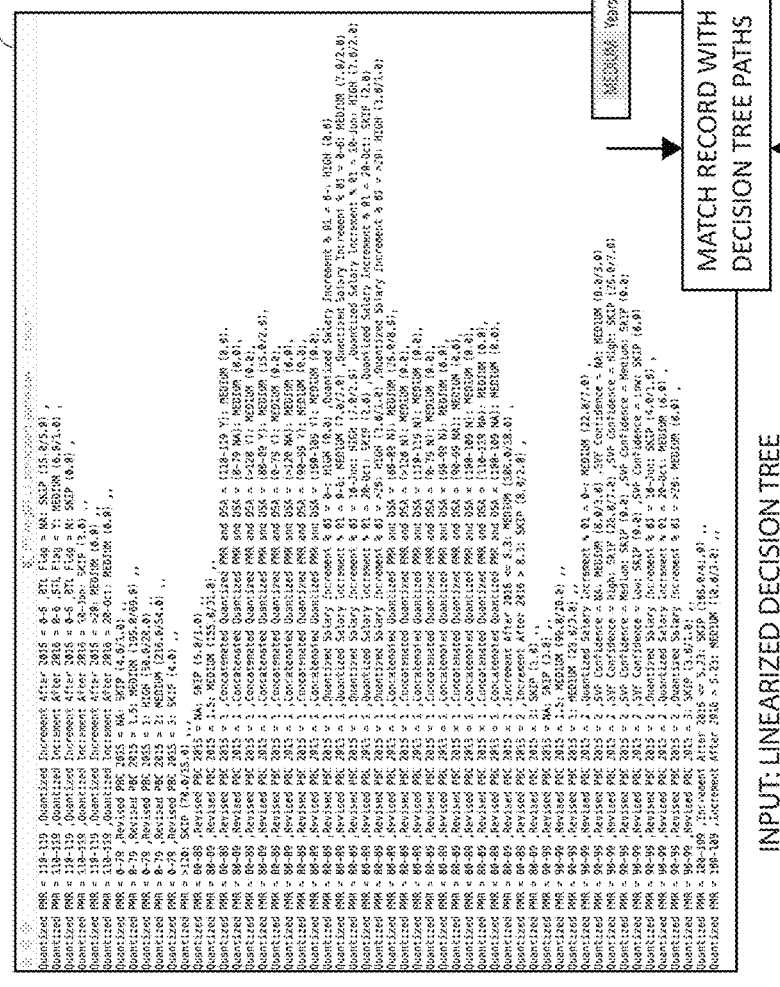
Figure 7C:
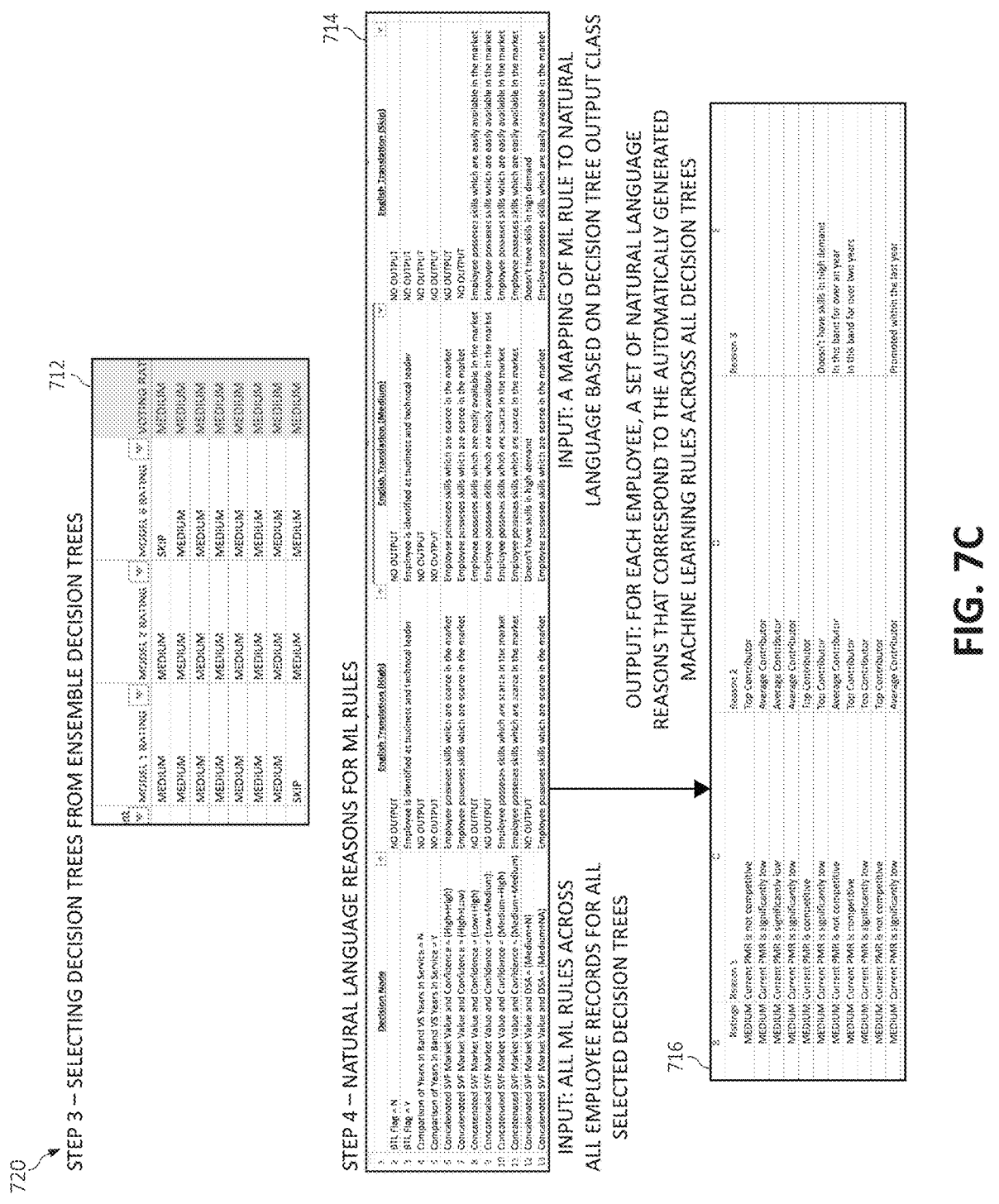

Turning now to FIG. 7A-7C, block diagrams 700, 710, and 720 depict operations/steps for generating natural language reasons ("NLR") for explaining automatically generated machine learning recommendations from an ensemble of classifiers. In one aspect, many of the functional blocks previously described in FIGS. 1-5A-5E may be applied and used for executing one or more operations and/or functionality described in FIGS. 7A-7C. Repetitive description of like elements, components, modules, services, applications, and/or functions employed in other embodiments described herein is omitted for sake of brevity.

Starting in step 1 illustrated in FIG. 7A, a decision tree 702 may be linearized such as, for example, linearized, data tree 704, which may be performed by the intelligent decision support system 400 of FIG. 1. Each line in the linearized, data tree 704 may correspond to a single path from a root leaf node of the decision tree.

In step 2 illustrated in FIG. 7B, the intelligent decision support system 400 may map user data (e.g., employee data) with machine learning ("ML") paths of the linearized, data tree 704. The intelligent decision support system 400 may use as input an employee record 706 and a decision tree result. A record may be matched with the decision tree paths. The output 708 of the intelligent decision support system 400 may be, for each user/employee, a set of machine learning rules that were followed in the path to reach a decision.

In step 3 illustrated in FIG. 7C, the output recommendations for each of the constituent decision trees of an ensemble for given data points (e.g., employee records) may be computed, as shown in block 712. In step 4, one or more easily consumable natural language reasons ("NLRs") 714 corresponding to every unique machine learning rule in the paths followed by any of the constituent decision trees of an ensemble to reach an output recommendation may be provided, as shown in block 714. Finally, the set of natural language reasons corresponding to the final ensemble recommendation for a data point is computed; in one instance, by selecting all the natural language reasons corresponding to the set of machine learning rules in the decision paths of all the decision trees that form the majority 'vote' in the ensemble of decision trees (e.g., majority voting with a tiebreaker rule may be used in this instance). The intelligent decision support system 400 may output, for each user (e.g., employee), this computed set of natural language reasons corresponding to the final ensemble recommendation, as shown in block 716.

Thus, an intelligent decision support system may provide for generating interpretable natural language reasons from an ensemble of classifiers. When classifiers are decision trees, the present invention may explicitly detail a complete path of a decision tree taken by a machine learning model to reach a decision. In domains where deeper and more consumable interpretability is desired (e.g., for HR decision making), the intelligent decision support system described herein may map or translate (e.g., using artificial intelligence and/or natural language processing ("NLP")) complete/entire machine learning path and the corresponding decision into natural language reasons. The intelligent decision support system may be used in applications such as, for example, making a compensation decision where not only the decision but the attribute values that contributed to the decision matter are defined/translated.

Figure 8A:
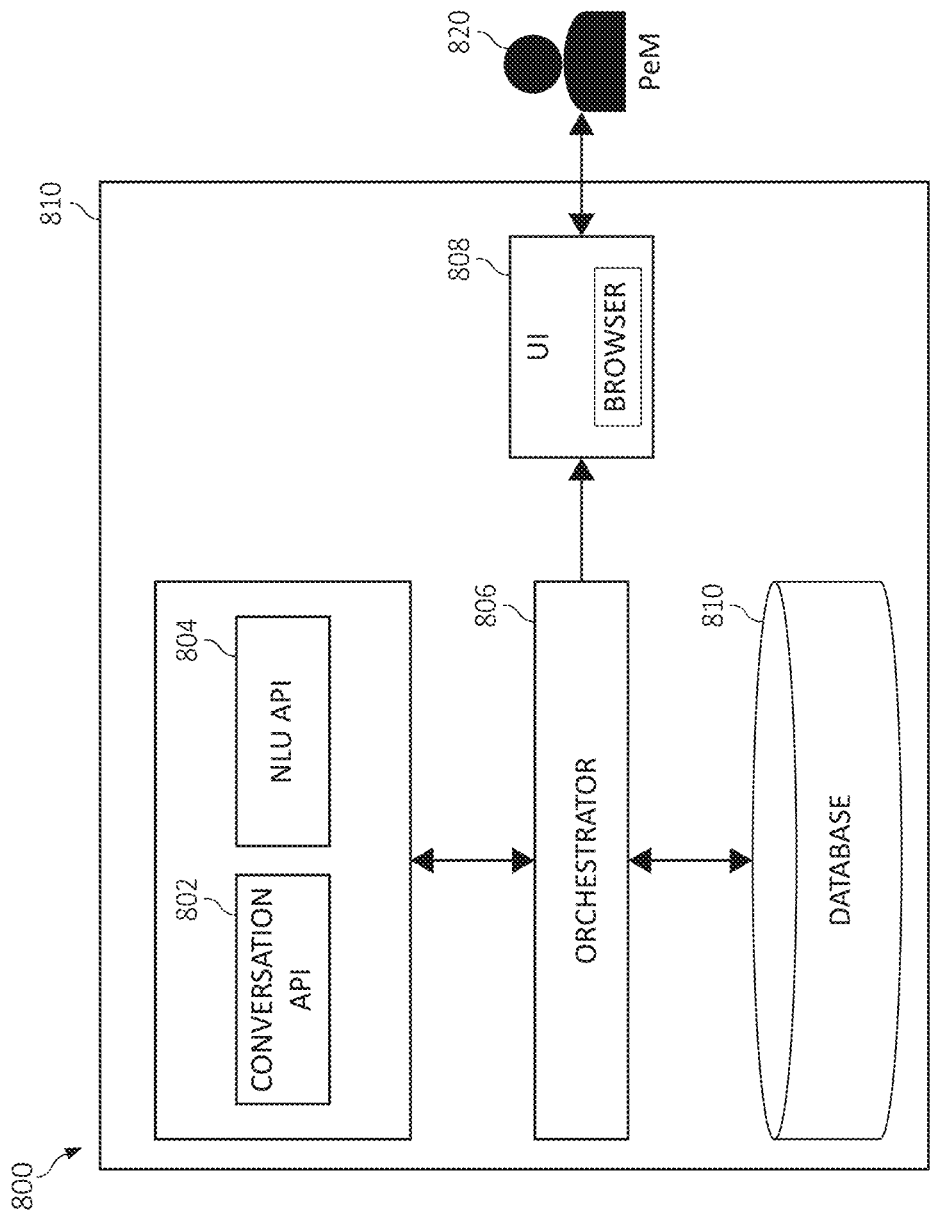
FIG. 8A is an additional block diagram depicting an intelligent decision support system in accordance with aspects of the present invention.

Turning now to FIG. 8A, diagram 800 illustrates an intelligent decision support system 800. As will be seen, many of the functional blocks may also be considered "modules" or "components" of functionality, in the same descriptive sense as has been previously described in FIGS. 1-4. With the foregoing in mind, the module/component blocks of diagram 800 may also be incorporated into various hardware and software components of a system for implementing an intelligent decision support system 810 in accordance with the present invention. Many of the functional blocks of the intelligent decision support system 800 may execute as background processes on various components, either in distributed computing components, or on the user device, or elsewhere.

In one aspect, computer system/server 12, incorporating processing unit 16 and memory 28 of FIG. 1 (not shown in FIG. 8 for illustrative convenience) may be used to perform various computational, data processing and other functionality in accordance with various aspects of the present invention.

In one aspect, the intelligent decision support system 810 may include a conversation application programming interface ("API") 802, a natural language understanding ("NLU") API 804, an orchestrator 806, a user interface ("UP") 808 and a database 812, each of which may be in communication with each other. The intelligent decision support system 810 may be in communication with user 820 (e.g., managers, administrators, supervisors, other employees, etc.).

In operation, the intelligent decision support system 810 may create a customized/personalized conversational chatbots that can automatically answer questions based on knowledge from unstructured information sources and structured personal information, which may be stored in database 812. The knowledge/information in the structured information sources may be customized/personal and dependent on the user such as, for example, user 820 asking the question after authentication. The information being provided may be from an ontology/domain included in the database 812 such as, for example, an HR domain and information about users/employees or guidance for managers. The personal information may be information about users/employees reporting to a user such as, for example, a user 820 that has accessed the intelligent decision support system 810. The intelligent decision support system 810 may respond to one or more queries received from user 820.

More specifically, all queries may be sent to a natural language understanding module (e.g., IBM® Watson® APIs 802), which can compute the underlying intent for each query and identify the entities and keywords within each query and pass these on to the orchestrator 806. (IBM® and Watson® are trademarks of International Business Machines Corporation). If the intent is personal information, the following may be performed as shown in FIGS. 8A and 8B.

Figure 8B:
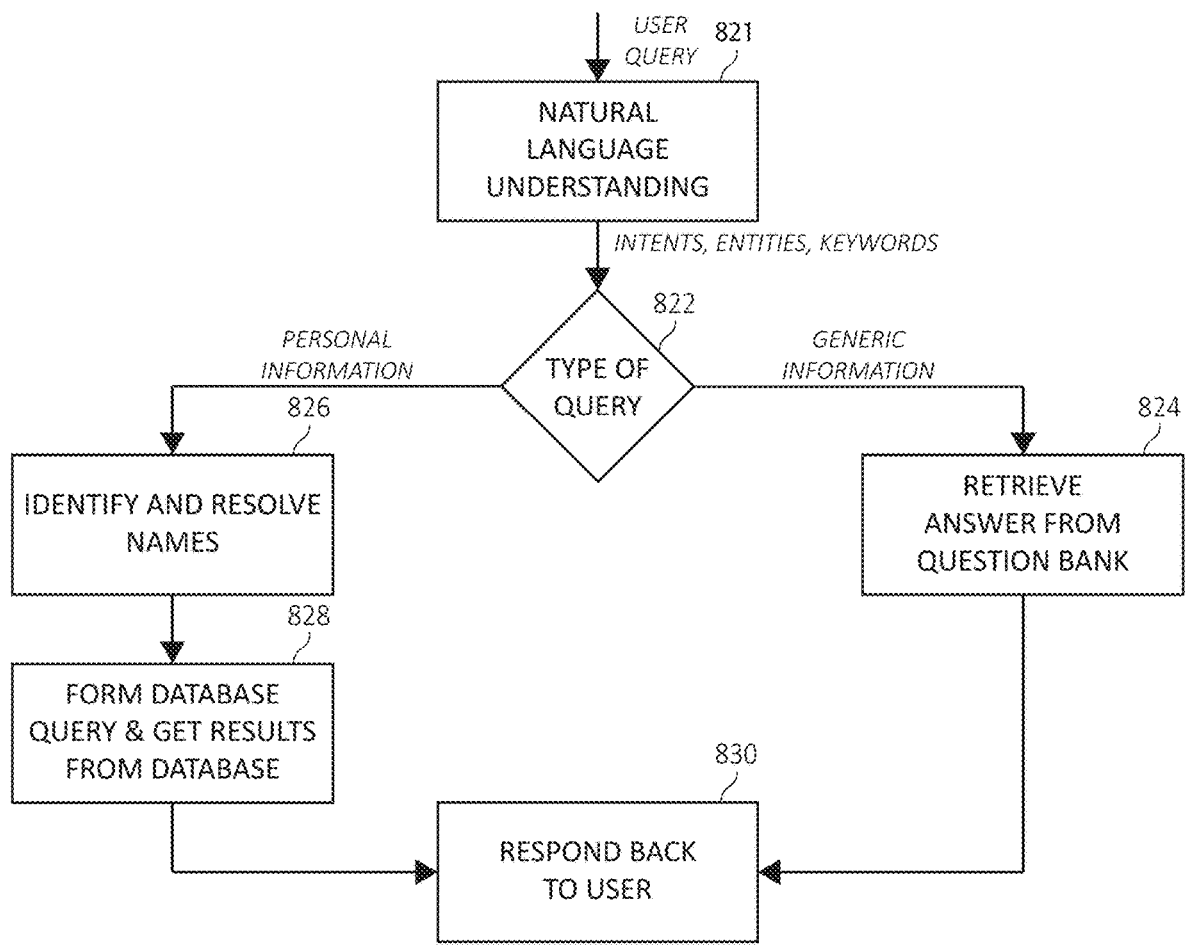
FIG. 8B is a flowchart diagram depicting an exemplary method for using an intelligent decision support system in a computing environment in accordance with an embodiment of the present invention.

Turning now to FIG. 8B, an additional method 850 is illustrated for implementing intelligent decision support in a computing environment (e.g., in a dialog system), in which various aspects of the illustrated embodiments may be implemented. The functionality 850 may be implemented as a method executed as instructions on a machine, where the instructions are included on at least one computer readable medium or on a non-transitory machine-readable storage medium.

The functionality 850 may start in block 821 by receiving a user query from a user and interpreting, providing, and/or analyzing the query using natural language understanding via a machine learning operation. In block 822, a type of query is determined such as, for example, determining if the query is for personal information or generalized ("generic") information. If the type of query is for generalized information, the method 850 may move to block 824 and retrieve one or more answers to a query from a database (e.g., a question bank). The method 850 may then move to block 830 where the retrieved answers may be provided back to the user (e.g., respond back to the user), as in block 830.

Returning to block 822, the type of query is for personal information, the method 850 may move to block 826 and identify and/or resolved one or more names. From block 826, the method 850 may move to block 828 and form a database query and retrieve results from the database, as in block 828. The method 850 may, again, move to block 830.

Thus, in operations, operations of FIGS. 8A and 8B may be summarized as follows. First, all the names in one or more queries may be identified based on intents, the entities and keywords. For example, the identified names may be resolved against individuals for whom information is being sought for and can be displayed (e.g., employees matching the name and reporting to the manager who has logged in and who is querying the chatbot). If multiple names match, a disambiguation strategy may be employed to determine if the intent is for a list of users or for a single user. If the query is for a single user and multiple names match, the chatbot may query back the user showing the set of matches and asking for a clarification of the exact individual. Once the individual or the list of individuals is determined, a database query (e.g., a Structured Query Language "SQL" query) may be formed to retrieve the desired personal information about the specific individuals. The information may be retrieved and shown to the user via the chatbot.

If the intent of the query is to obtain general information (e.g., an entity's program guidance, etc.), a response may be retrieved from a question bank and the UI may display the response back to user.

Figure 9:
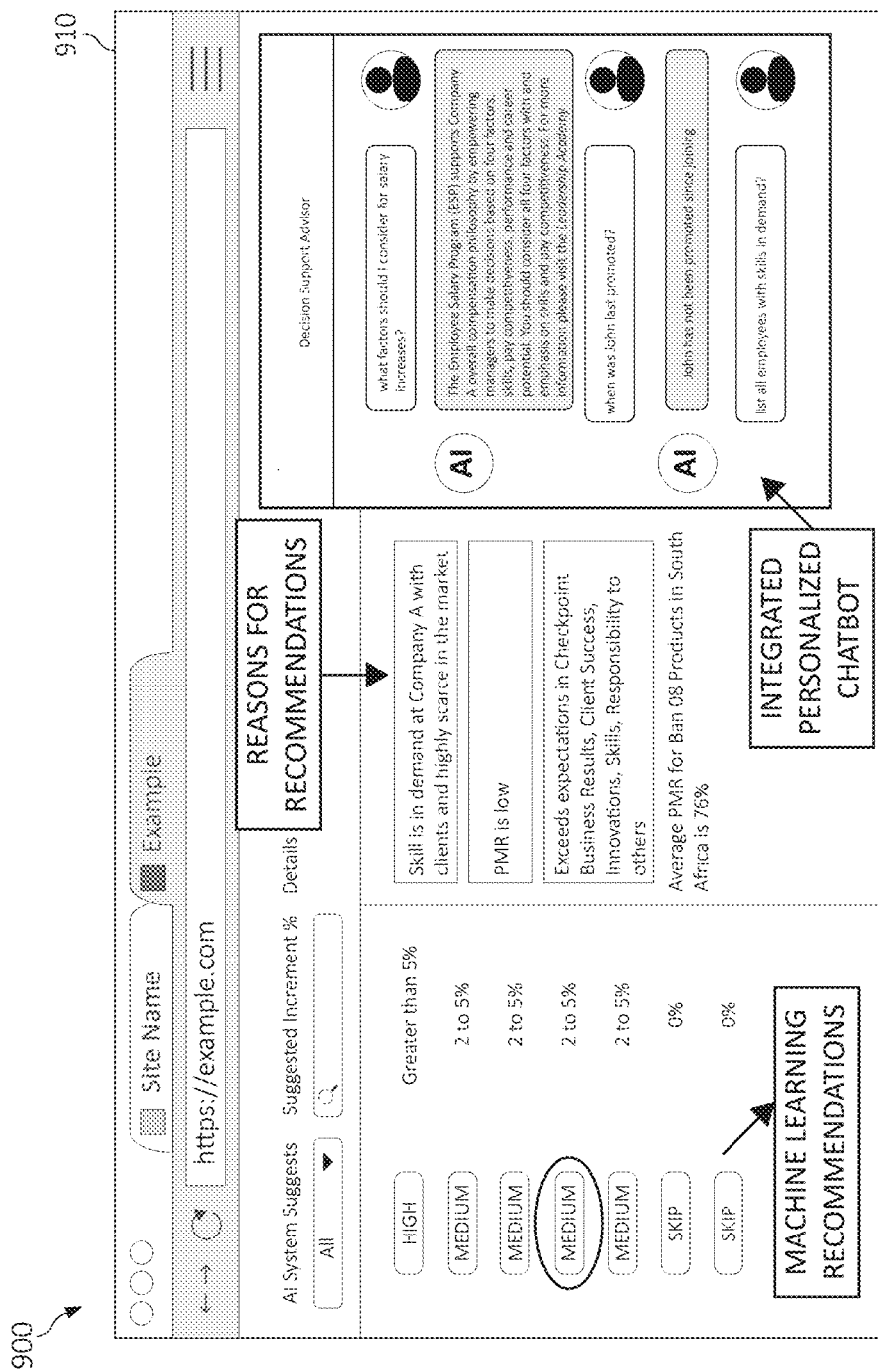
FIG. 9 is a diagram depicting a user interface display providing recommendations using an intelligent decision support system in accordance with aspects of the present invention.

Turning now to FIG. 9, diagram 900 illustrates a display 910 (e.g., a user interface/graphical user interface "GUI") providing recommendations using an intelligent decision support system using the intelligent decision support systems 400 or 800 of FIGS. 4 and 8, which may use the intelligent decision support service 402 and the dialog system 404.

For example, the display 910 (e.g., the dialog system 404) may provide the ability to target a selected user (e.g., a targeted employee) for making a decision such as, for example, determining a compensation adjustment using artificial intelligence ("AI") based advice/suggestions. For example, one or more machine learning recommendations may be provided for a compensation increase prioritizations with supporting reasons/evidence via the display 910 (e.g., customized/personalized chatbot/dialog system 404).

Figure 10:
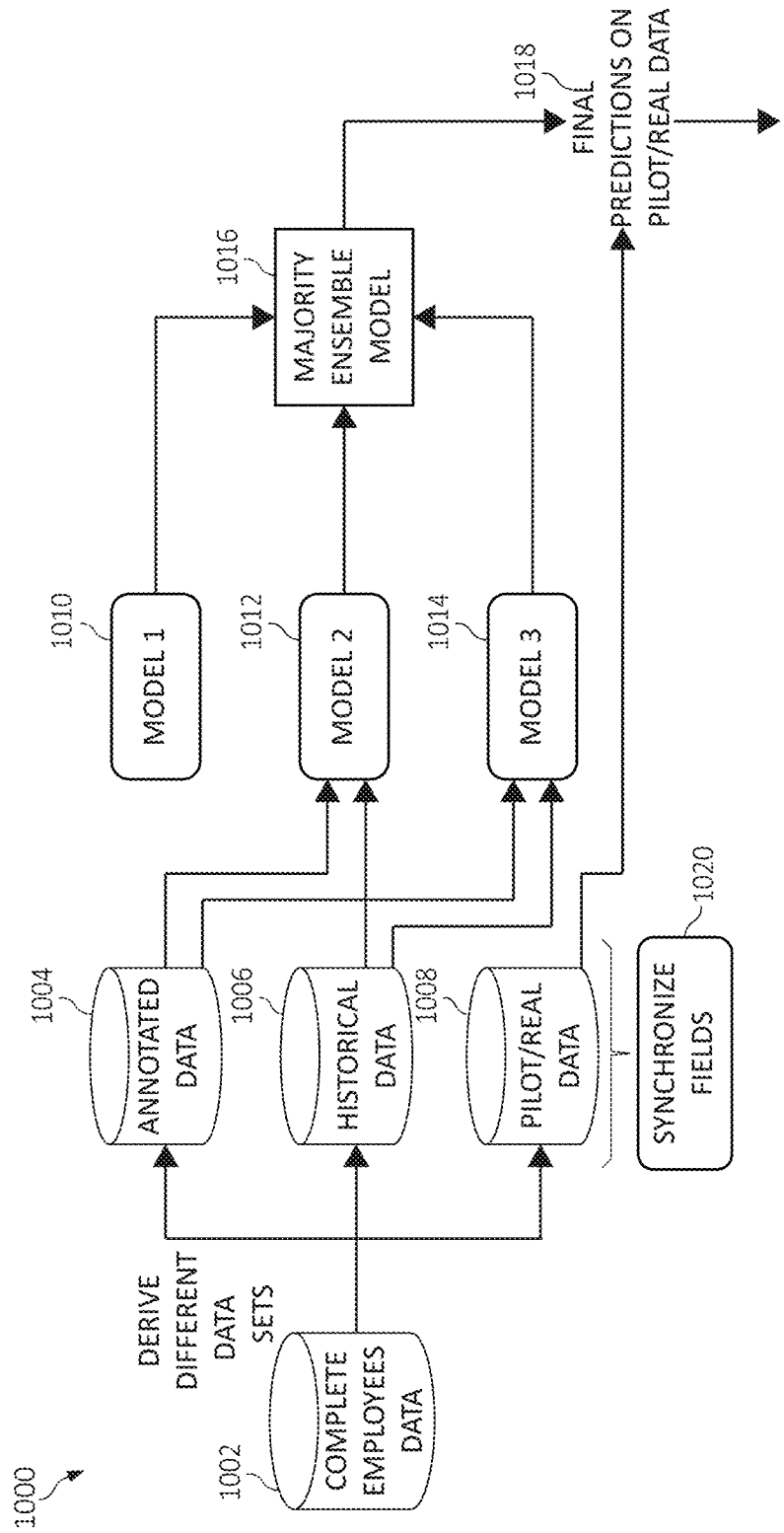
FIG. 10 is an additional block diagram depicting an intelligent decision support system in accordance with aspects of the present invention.

FIG. 10 is an additional block diagram depicting an intelligent decision support system. As will be seen, many of the functional blocks may also be considered "modules" or "components" of functionality, in the same descriptive sense as has been previously described in FIGS. 1-9. With the foregoing in mind, the module/component blocks of diagram 1000 may also be incorporated into various hardware and software components.

In operation, historical data 1006 (e.g., historical compensation data that may include prior compensation increases history along with all available employee attributes at that time) may be collected. A separate annotated data set such as, for example the annotated data 1004 may be created by having domain experts annotate data that could be synthetic data or real data 1008 (e.g., pilot/real data) with fictional increases marked by one or more domain experts specifically for compensation increases.

One or more different splits of historical data H may be derived. One or more different splits of annotated data A may be derived. Data fields of all the splits of historical data H and annotated data A may be synchronized. One or more common set of features may be derived based on user attributes (e.g., employee attributes). It should be noted that the historical data and the annotated data (e.g., the historical compensations and collected annotated) may not be compatible. Thus, the historical data 1006 and the annotated data 1004 may be interpolated, and one or more different fields may be derived in the two datasets to have comparable fields. For example, a last salary increase cycle in the historical data may be used to derive increment ratings to be predicted by a machine learning models and/or previous salary increases may be aggregated and organized in increments in last six months, last year, etc., to enable parallel timelines for different compensations. One or more attributes may be derived using a combinations of fields.

One or more ensemble models 1016 (e.g., a majority ensemble model) for machine learning may be used using the splits of historical data H and annotated data A using models 1010, 1012, and 1014 (e.g., models 1, model 2, model 3). The individual models such as, for example, models 1010, 1012, and 1014 provide complimentary insights. Thus, one or more sampling strategies on each datasets may be employed such as, for example, a subset from historical data containing employees in annotated and pilot sets, a subsample of historical data that has distribution similar to annotated data, combined subsamples of historical data with annotated data, and/or various sizes of samples. In one aspect, the present invention first constructs a set of weak models using above mentioned splits, and then combines them using one or more ensemble methods, which leads to an aggregate strong model. For example, in one instantiation of invention, the present invention may use an ensemble of three different models and output is chosen as the majority among the three classifiers.

In one aspect, one or more machine learning operations and/or decision trees may be used. A final classification 1018 (e.g., a final prediction on pilot/real data of salary decisions) may be generated using one or more ensemble models 1016 (e.g., a majority ensemble model). To generate the final classification, the classifications of the constituent models of the ensemble are combined using a combination technique (e.g., for a given data point, picking/selecting the class with majority 'votes' from an individual models. Other combination techniques can also be used). In one embodiment, a majority voting scheme may be used.

Thus, as described herein, the present invention may combine historical data/actions with new, domain expert annotation data to train one or more machine learning models for an automated and intelligent decision support system for helping with actions in a particular domain. In one aspect, compatible semantics may be derived across historical compensations and current, data annotations and adjust for guidelines changes. An array of prediction model may be generated using one or more different splits of the data to compensate for much larger size of historical data sets. An ensemble operation may be used combine these prediction models to generate stronger and accurate decision models.

Figure 11:
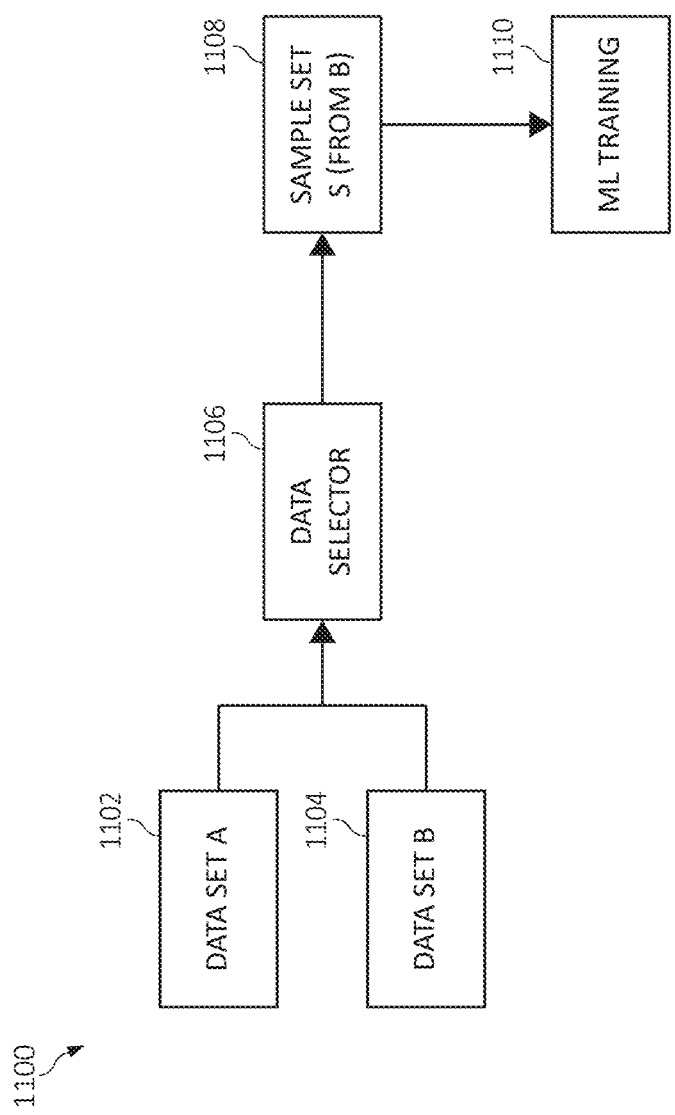
FIG. 11 is an additional diagram depicting an intelligent decision support system in accordance with aspects of the present invention.

FIG. 11 is an additional block diagram depicting operations within an intelligent decision support system. As will be seen, many of the functional blocks may also be considered "modules" or "components" of functionality, in the same descriptive sense as has been previously described in FIGS. 1-10. With the foregoing in mind, the module/component blocks of diagram 1100 may also be incorporated into various hardware and software components.

That is, FIG. 11 illustrates 1100 operations for selecting samples of labelled data (e.g., for a HR use case, employee data along with proposed salary increments) from data sets based on similarity with other data sets for building an intelligent decision support system such as, for example, the intelligent decision support system 400 of FIG. 4. Repetitive description of like elements, components, modules, services, applications, and/or functions employed in other embodiments described herein is omitted for sake of brevity.

In one aspect, data set A 1102 of labelled data (e.g., data labelled with the decision being modelled such as, for example, employee data along with proposed salary increments for a HR use case) and data set B 1104 of related/similar data (e.g., data annotated by domain experts to generate examples of salary increase decisions for a HR use case) may be selected and/or used by a data selector 1106. For each data point B1 from data set B 1104, the following operations may be performed. First, a closest/most similar match to any data point in data set A 1102 may be identified using a distance measure comparing all attributes of data point (e.g., a Euclidean distance measure after converting all attributes to a numerical measure). To further illustrate, suppose the closest match is to data point C (from data set A) and the corresponding distance (between B1 and C) is D. Second, the corresponding distance D may be compared to an average distance between any two points in data set A 1102 using a same distance measure.

Third, if the corresponding distance D is less than the average distance, the point B1 (from the data set B) may be added to the sample set S 1108. Similarly, iterating through every data point in data set B, additional data points from the data set B may be added to the sample set S 1108 if they are as similar to their respective closest match in data set A as the average similarity within data set A. Thus, a sample set S, selected from data set B can be built that consists of all data points in B that are 'similar' to data points in data set A.

One or more machine learning models 1110 ML models may be built using both data set A and data set S to obtain increased/higher accuracy models. In an additional aspect, other similarity measures such as, for example, a Manhattan distance measure, may be used instead of Euclidean distance. Instead of comparing the distance D (e.g., for a data point B1 from the data set B with the closest point C from the data set A) with the average distance among data points in the data set A, in one other embodiment, the comparison can be of D with the closest distance of any data point in data set A with any other data point in data set A using the same distance measure. This will lead to a more conservative selection of data points for the sample set S to consist of only the data points in B that are really close to data points in A. In another embodiment, the comparison can be of D with the farthest distance of any data point in data set A with any other data point in data set A using the same distance measure This will lead to a more liberal selection of data points for the sample set.

Thus, the present invention provides for selecting annotations (e.g., labeled data) from one or more data sets based on a similarity with a reference data set for use in a machine learning application tied to the reference data set. The selection of the annotations may be based on similarity measures between data points in the reference data set and examples of other data sets. Additionally, the selection of the annotations may be based on a comparison of the closeness/similarity of a data point in other data sets with any point in the reference data set and a comparison of this with the closest or average or farthest distance between any two points in the reference data set (different embodiments). The similarity/distance measure may be a Euclidean distance or Manhattan distance. The present invention provides an application for decision support systems where there is a data set of historical decisions and a data set of newly annotated data (reference data set) for specific decisions.

Figure 12:
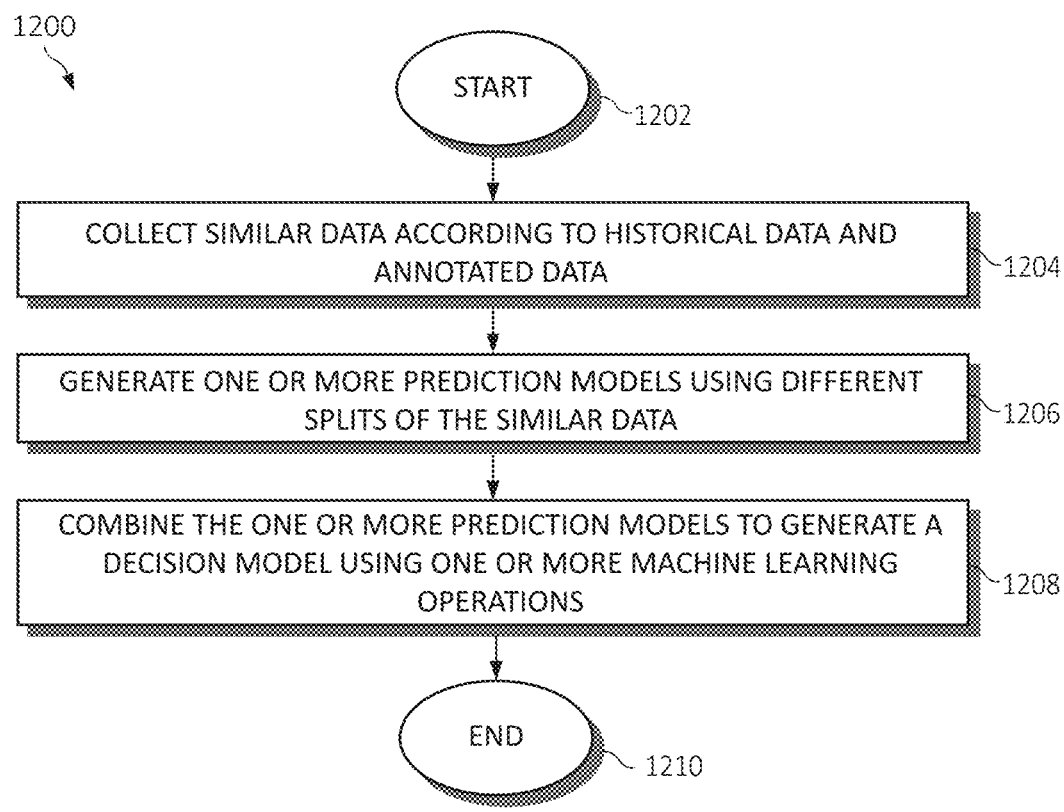
FIG. 12 is a flowchart diagram depicting an exemplary method for implementing intelligent decision support system in a computing environment in accordance with an embodiment of the present invention.

Turning now to FIG. 12, an additional method 1200 is illustrated for implementing intelligent decision support in a computing environment (e.g., in a dialog system), in which various aspects of the illustrated embodiments may be implemented. The functionality 1200 may be implemented as a method executed as instructions on a machine, where the instructions are included on at least one computer readable medium or on a non-transitory machine-readable storage medium.

The functionality 1200 may start in block 1202. Similar data may be combined/collected according to historical data and annotated data, as in block 1204. One or more prediction models may be generated using different splits of the similar data, as in block 1206. The one or more prediction models may be combined to generate a decision model using one or more machine learning operations, as in block 1208. The functionality 1200 may end in block 1210.

In one aspect, in conjunction with and/or as part of at least one block of FIG. 12, the operations of 1200 may include each of the following. The operations of 1200 may combine structured and unstructured data from one or more data sources and customize communications in a dialog system according to the structured and unstructured data. The historical data and the annotated data may be interpolated using an ensemble of classifiers.

The operations of 1200 may select the annotated data from a data set based on a degree of similarity with one or more alternative data sets. The operations of 1200 may explain one or more recommendations from the one or more prediction models according to a natural language operation.

In one aspect, the operations of 1200 may collect the historical data, collect the annotated data from one or more domain experts, derive the different splits of both the historical data and the annotated data, and/or determine one or more features from one or more attributes of a selected entity from similar data fields of the different splits.

The operations of 1200 may initiate a machine learning to perform one or more machine learning operations to perform a semantic analysis, train a classifier, learn one or more machine learning rules, learn contextual data associated with the dialog system, learn and train the one or more prediction models using the historical data and the annotated data, generate one or more recommendations or predictions from the one or more prediction models, and assist with engaging in communication using the dialog system, or perform a combination thereof.

Figure 13:
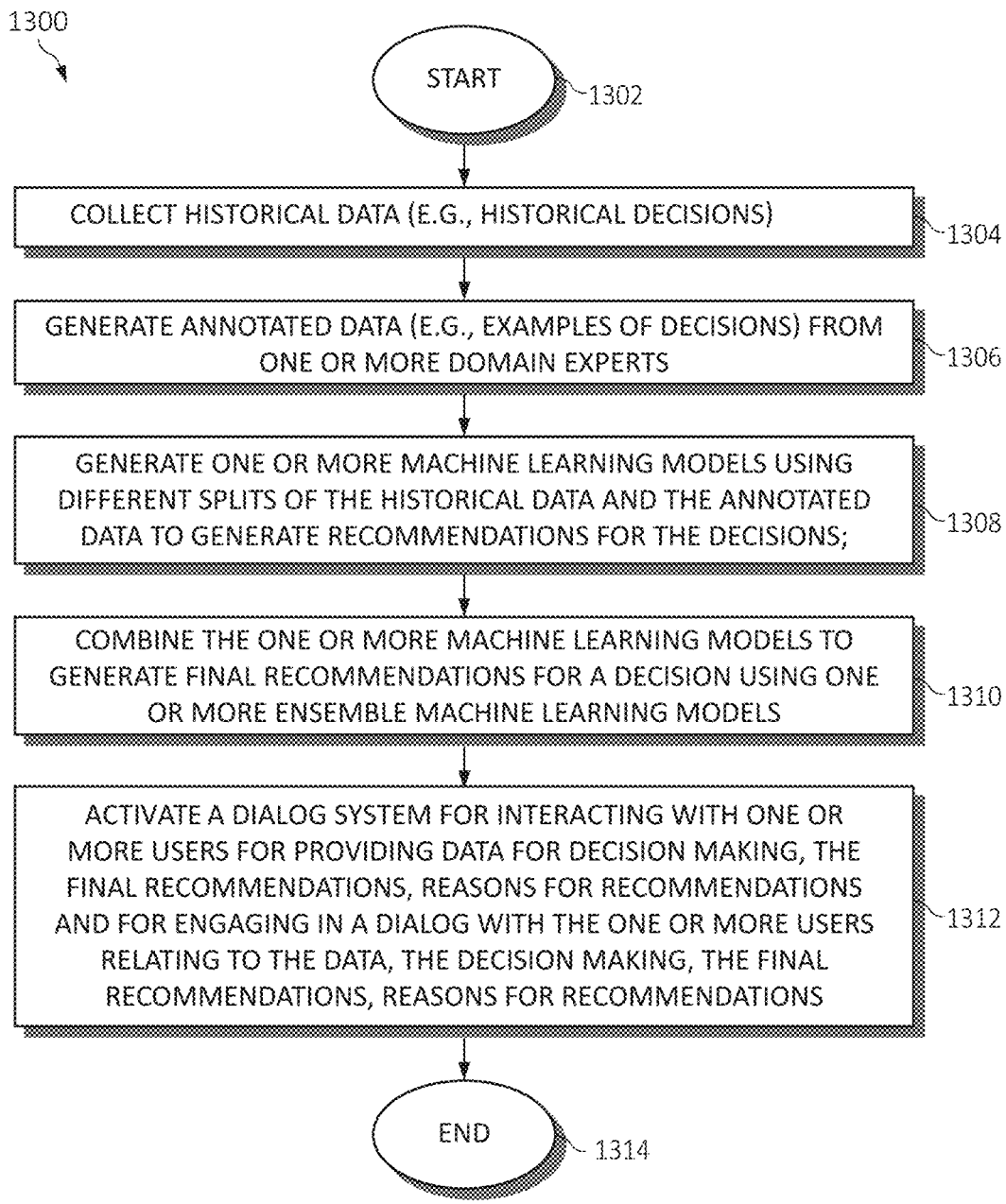
FIG. 13 is a flowchart diagram depicting an additional exemplary method for implementing intelligent decision support system in a computing environment in accordance with an embodiment of the present invention.

Turning now to FIG. 13, an additional method 1300 is illustrated for implementing intelligent decision support in a computing environment (e.g., in a dialog system), in which various aspects of the illustrated embodiments may be implemented. The functionality 1300 may be implemented as a method executed as instructions on a machine, where the instructions are included on at least one computer readable medium or on a non-transitory machine-readable storage medium.

The functionality 1300 may start in block 1302 by collecting data about collect data about historical data (e.g., historical decisions), as in block 1304. Annotated data (e.g., examples of decisions) may be collected/generated from one or more domain experts, as in block 1306. One or more machine learning models may be generated/used using different splits of the historical data and the annotated data to generate recommendations for the decisions, as in block 1308. The one or more machine learning models may be used to generate final recommendations for a decision using one or more ensemble machine learning models, as in block 1310. A dialog system may be activated for interacting with one or more users for providing data for decision making, the final recommendations, reasons for recommendations and for engaging in a dialog with the one or more users relating to the data, the decision making, the final recommendations, reasons for recommendations, as in block 1312. The functionality 1300 may end in block 1314.

In one aspect, in conjunction with and/or as part of at least one block of FIG. 13, the operations of 1300 may include each of the following. The operations of 1300 may, using the dialog system, display structured and unstructured data of one or more entities (e.g., users, business, persons, organizations, etc.) and information about decision making from one or more data sources. The operations of 1300 may provide analytics dynamically analyzing domain expert decisions, analytics suggesting evidence and reasons for the recommendations. The operations of 1300 may, using the dialog system, provide a natural language conversational dialog system for answering user queries about the data about individuals, information about decision making, recommendations, and reasons behind recommendations, an ability for users to enter or validate data about individuals shown to them; and grouping of all employee attributes to reflect business priorities for the corresponding decisions.

The operations of 1300 may automatically determine the intended individual or group of individuals about whom information is requested by users interacting with the conversational dialog system using natural language processing, automatically retrieve the information requested by users about the individual or group of individuals, and/or display/show the specific data about specific individual or individuals to users interacting with the conversational dialog system after authentication depending on the information sharing policies in effect and the specific queries by the users; and additionally, showing generic data applicable to all users to users interacting with the conversational dialog system depending on the information sharing policies in effect and the specific queries by the users.

The operations of 1300 may select samples of data sets to be used by machine learning models based on a degree of similarity with a reference data set and using the sampled data set as additional data for training the machine learning models.

The operations of 1300 may determine the similarity (e.g., degree of similarity) between data points in the reference data set and data points in the data sets being sampled, determine the similarity between all possible pairs of data points in the reference data set; determine the smallest, largest and average values of the similarity between all possible pairs of data points in the reference data set, and/or select data points from the data sets being sampled for inclusion in the sample data set if the computed degree of similarity measures for these data points is lower than the smallest or largest, or average values of the degree of similarity between any two data points in the reference data set. The degree of similarity measure used for measuring the similarity between two data points is one or more of the following measures: 1) the sum of the number of attributes that match exactly between two data points, 2) the cosine distance between the numerical representations of the two data points, 3) the Euclidean distance between the numerical representations of the two data points, and/or 4) the Manhattan distance between the numerical representations of the two data points.

The operations of 1300 may generate interpretable natural language reasons for the recommendations generated by one or more machine learning models and displaying the reasons along with the recommendations in a user interface (e.g., using a dialog system) with users of the decision support system.

The operations of 1300 may perform one or more of the following when the machine learning models are decision trees by: 1) computing the complete set of machine learning rules that were followed in the path by the decision tree to arrive at an output recommendation; 2) mapping every unique machine learning rule in the path to an easily consumable natural language reason; and/or 3) displaying/showing the set of natural language reasons as the reasons for a recommendation by the machine learning model to the user via the user interface.

The operations of 1300 may perform one or more of the following the machine learning models are ensembles of decision trees by: 1) for every constituent decision tree model in the ensemble, computing the complete set of machine learning rules that were followed in the path by that decision tree to arrive at an output recommendation; 2) mapping every unique machine learning rule in the paths by all of the constituent decision tree models to an easily consumable natural language reason; 3) for each data point for which recommendations are being generated, creating a set of reasons by computing a union of the set of natural language reasons mapped from the paths followed by the subset of constituent decision tree models that participated in the final recommendation by the ensemble of decision trees for that data point, and/or 4) for each data point for which recommendations are being generated, showing this set of natural language reasons as the reasons for the recommendation by the ensemble machine learning model to the user via the user interface.

The operations of 1300 may perform collect the historical data; generate the annotated data using one or more human domain experts; derive compatible semantics across historical data and annotated data adjusting for differences; derive different splits of the historical data and the annotated data; train different machine learning models for generating recommendations using the different splits; and/or create one or more ensemble machine learning models combining the recommendations from each of the different machine learning models to generate the final recommendations to be shown to users via the user interface.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for implementing intelligent decision support for decision making in a computing environment by a processor, comprising:
   collecting data about a plurality of historical data;
   generating one or more samples of annotated data by one or more domain experts;
   generating one or more machine learning models using different splits of the data and the annotated data to generate recommendations for one or more decisions;
   combining the one or more machine learning models to generate a recommendation for the one or more decisions using one or more ensemble machine learning models;
   generating one or more natural language reasons for the recommendations by one or more machine learning models and providing one or more reasons for the recommendation using a dialog system and performing each of the following upon the one or more machine learning models being an ensemble of decision trees:
  for each constituent decision tree model in the ensemble, determining a set of machine learning rules that were used in a path by a decision tree to arrive at an output recommendation;
  mapping each machine learning rule in the path by each of the constituent decision tree models to a natural language reason;
  for each data point for which the recommendations are being generated, creating a set of reasons by computing a union of a set of natural language reasons mapped from paths followed by a subset of the constituent decision tree models that participated in a final recommendation by the ensemble of decision trees for the data point; and
for each of the data points for which recommendations are being generated, displaying the set of natural language reasons as the reasons for the recommendation by the ensemble machine learning model; and
interacting with a user via the dialog system and engaging in a dialog with the user in relation to the questions about the data and the recommendation.

2. The method of claim 1, further including:
displaying structured and unstructured data via the dialog system pertaining to one or more entities and information from one or more data sources;
displaying an analysis of decisions up to a current time period;
providing evidence for the one or more reasons for the recommendations;
engaging in a series of queries with the user in relation to the data, the recommendation, or a combination thereof;
enabling the user to enter or validate data; and
grouping one or more attributes of one of a plurality of entities to reflect one or more priorities of an entity relating to the data, the recommendation, or a combination thereof.

3. The method of claim 1, further including:
automatically determining an intended entity or group of entities pertaining to requested information by the user via the dialog system;
automatically retrieving the requested information about the intended entity or the group of entities;
identifying specific data about the intended entity or group of entities according to one or more policies in effect and specific queries by the users; and
providing generic data applicable to a plurality of users interacting with the dialog system according to the one or more policies in effect and specific queries by the user.

4. The method of claim 1, further including:
selecting sampled data sets to be used by machine learning models based on a degree of similarity with a reference data set and using the sampled data set as additional data for training the machine learning models;
determining the degree of similarity between data points in the reference data set and the data points in the sampled data sets;
determining the degree of similarity between all pairs of data points in the reference data set;
determining a smallest value, a largest value, and an average values of the degree of similarity between the pairs of data points in the reference data set; and
selecting the data points from the sampled data sets if the degree of similarity is lower than the smallest value, the largest value, or the average values of the degree of similarity between any two data points in the reference data set.

5. The method of claim 1, further including:
collecting the historical data;
generating the annotated data using one or more domain experts;
deriving compatible semantics across historical data and the annotated data adjusting for differences;
deriving different splits of the historical data and the annotated data;
training the machine learning models for generating one or more recommendations using the different splits; and
creating ensemble machine learning models by combining the one or more recommendations from each of the machine learning models to generate the recommendation.

6. The method of claim 1, further including initiating a machine learning to perform one or more machine learning operations to perform a semantic analysis, train a classifier, learn one or more machine learning rules, learn contextual data associated with the dialog system, learn and train the one or more prediction models using the historical data and the annotated data, generate one or more recommendations or predictions from the one or more prediction models, and assist with engaging in communication using the dialog system, or perform a combination thereof.

7. A system for implementing intelligent decision support for decision making in a computing system, comprising:
  one or more computers with executable instructions that when executed cause the system to:
    collect data about a plurality of historical data;
    generate one or more samples of annotated data by one or more domain experts;
    generate one or more machine learning models using different splits of the data and the annotated data to generate recommendations for one or more decisions;
    combine the one or more machine learning models to generate a recommendation for the one or more decisions using one or more ensemble machine learning models;
    generate one or more natural language reasons for the recommendations by one or more machine learning models and providing one or more reasons for the recommendation using a dialog system and
    perform each of the following upon the one or more machine learning models being an ensemble of decision trees:
      for each constituent decision tree model in the ensemble, determining a set of machine learning rules that were used in a path by a decision tree to arrive at an output recommendation;
      mapping each machine learning rule in the path by each of the constituent decision tree models to a natural language reason;
      for each data point for which the recommendations are being generated, creating a set of reasons by computing a union of a set of natural language reasons mapped from paths followed by a subset of the constituent decision tree models that participated in a final recommendation by the ensemble of decision trees for the data point; and for each of the data points for which recommendations are being generated, displaying the set of natural language reasons as the reasons for the recommendation by the ensemble machine learning model; and interact with a user via the dialog system and engaging in a dialog with the user in relation to the questions about the data and the recommendation.

8. The system of claim 7, wherein the executable instructions:

display displaying structured and unstructured data via the dialog system pertaining to one or more entities and information from one or more data sources;

display an analysis of decisions up to a current time period;

provide evidence for the one or more reasons for the recommendations;

engage in a series of queries with the user in relation to the data, the recommendation, or a combination thereof;

enable the user to enter or validate data; and group one or more attributes of one of a plurality of entities to reflect one or more priorities of an entity relating to the data, the recommendation, or a combination thereof.

9. The system of claim 8, wherein the executable instructions:

automatically determine an intended entity or group of entities pertaining to requested information by the user via the dialog system;

automatically retrieve the requested information about the intended entity or the group of entities;

identify specific data about the intended entity or group of entities according to one or more policies in effect and specific queries by the users; and provide generic data applicable to a plurality of users interacting with the dialog system according to the one or more policies in effect and specific queries by the user.

10. The system of claim 8, wherein the executable instructions:

select sampled data sets to be used by machine learning models based on a degree of similarity with a reference data set and using the sampled data set as additional data for training the machine learning models;

determine the degree of similarity between data points in the reference data set and the data points in the sampled data sets;

determine the degree of similarity between all pairs of data points in the reference data set;

determine a smallest value, a largest value, and an average values of the degree of similarity between the pairs of data points in the reference data set; and select the data points from the sampled data sets if the degree of similarity is lower than the smallest value, the largest value, or the average values of the degree of similarity between any two data points in the reference data set.

11. The system of claim 8, wherein the executable instructions:

collect the historical data;

generate the annotated data using one or more domain experts;

derive compatible semantics across historical data and the annotated data adjusting for differences;

derive different splits of the historical data and the annotated data;

train the machine learning models for generating one or more recommendations using the different splits; and create ensemble machine learning models by combining the one or more recommendations from each of the machine learning models to generate the recommendation.

12. The system of claim 8, wherein the executable instructions initiate a machine learning to perform one or more machine learning operations to perform a semantic analysis, train a classifier, learn one or more machine learning rules, learn contextual data associated with the dialog system, learn and train the one or more prediction models using the historical data and the annotated data, generate one or more recommendations or predictions from the one or more prediction models, and assist with engaging in communication using the dialog system, or perform a combination thereof.

13. A computer program product for, by a processor, implementing intelligent decision support for decision making in a computing system, the computer program product comprising a non-transitory computer-readable storage medium having computer-readable program code portions stored therein, the computer-readable program code portions comprising:

an executable portion that collects data about a plurality of historical data;

an executable portion that generates one or more samples of annotated data by one or more domain experts;

an executable portion that generates one or more machine learning models using different splits of the data and the annotated data to generate recommendations for one or more decisions;

an executable portion that combines the one or more machine learning models to generate a recommendation for the one or more decisions using one or more ensemble machine learning models;

an executable portion that generates one or more natural language reasons for the recommendations by one or more machine learning models and providing one or more reasons for the recommendation using a dialog system and an executable portion that performs each of the following upon the one or more machine learning models being an ensemble of decision trees:

for each constituent decision tree model in the ensemble, determining a set of machine learning rules that were used in a path by a decision tree to arrive at an output recommendation;

mapping each machine learning rule in the path by each of the constituent decision tree models to a natural language reason;

for each data point for which the recommendations are being generated, creating a set of reasons by computing a union of a set of natural language reasons mapped from paths followed by a subset of the constituent decision tree models that participated in a final recommendation by the ensemble of decision trees for the data point; and for each of the data points for which recommendations are being generated, displaying the set of natural language reasons as the reasons for the recommendation by the ensemble machine learning model; and an executable portion that interacts with a user via the dialog system and engaging in a dialog with the user in relation to the questions about the data and the recommendation.

14. The computer program product of claim 13, further including an executable portion that:
displays structured and unstructured data via the dialog system pertaining to one or more entities and information from one or more data sources;
displays an analysis of decisions up to a current time period;
provides evidence for the one or more reasons for the recommendations;
engages in a series of queries with the user in relation to the data, the recommendation, or a combination thereof;
enables the user to enter or validate data; and
groups one or more attributes of one of a plurality of entities to reflect one or more priorities of an entity relating to the data, the recommendation, or a combination thereof.

15. The computer program product of claim 13, further including an executable portion that:
automatically determines an intended entity or group of entities pertaining to requested information by the user via the dialog system;
automatically retrieves the requested information about the intended entity or the group of entities;
identifies specific data about the intended entity or group of entities according to one or more policies in effect and specific queries by the users; and
provides generic data applicable to a plurality of users interacting with the dialog system according to the one or more policies in effect and specific queries by the user.

16. The computer program product of claim 15, further including an executable portion that:
selects sampled data sets to be used by machine learning models based on a degree of similarity with a reference data set and using the sampled data set as additional data for training the machine learning models;
determines the degree of similarity between data points in the reference data set and the data points in the sampled data sets;
determines the degree of similarity between all pairs of data points in the reference data set;
determines a smallest value, a largest value, and an average values of the degree of similarity between the pairs of data points in the reference data set; and
selects the data points from the sampled data sets if the degree of similarity is lower than the smallest value, the largest value, or the average values of the degree of similarity between any two data points in the reference data set.

17. The computer program product of claim 13, further including an executable portion that:
collects the historical data;
generate the annotated data using one or more domain experts;
derive compatible semantics across historical data and the annotated data adjusting for differences;
derive different splits of the historical data and the annotated data;
train the machine learning models for generating one or more recommendations using the different splits;
create ensemble machine learning models by combining the one or more recommendations from each of the machine learning models to generate the recommendation.

18. The computer program product of claim 15, further including an executable portion that initiates a machine learning to perform one or more machine learning operations to perform a semantic analysis, train a classifier, learn one or more machine learning rules, learn contextual data associated with the dialog system, learn and train the one or more prediction models using the historical data and the annotated data, generate one or more recommendations or predictions from the one or more prediction models, and assist with engaging in communication using the dialog system, or perform a combination thereof.

* * * * *